（12） United States Patent
Yasuda et al.

(10) Patent No.: US 10,771,707 B2
(45) Date of Patent: Sep. 8, 2020

(54) INFORMATION PROCESSING DEVICE AND INFORMATION PROCESSING METHOD

(71) Applicant: SONY CORPORATION, Tokyo (JP)

(72) Inventors: Ryouhei Yasuda, Kanagawa (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/336,198

(22) PCT Filed: Aug. 21, 2017

(86) PCT No.: PCT/JP2017/029709
§ 371 (c)(1),
(2) Date: Mar. 25, 2019

(87) PCT Pub. No.: WO2018/074045
PCT Pub. Date: Apr. 26, 2018

(65) Prior Publication Data
US 2019/0230290 A1    Jul. 25, 2019

(30) Foreign Application Priority Data
Oct. 17, 2016   (JP) .................. 2016-203349

(51) Int. Cl.
H04N 5/232    (2006.01)
G06T 19/00    (2011.01)
(Continued)

(52) U.S. Cl.
CPC ......... H04N 5/23296 (2013.01); G02B 7/08 (2013.01); G03B 15/00 (2013.01); G06T 19/00 (2013.01);
(Continued)

(58) Field of Classification Search
CPC ......... H04N 5/23296; H04N 5/232945; H04N 5/23299; H04N 5/23218; G06T 19/00; G02B 7/08; G03B 15/00
(Continued)

(56) References Cited

U.S. PATENT DOCUMENTS 8,447,178 B2 *   5/2013   Yasuda ................. G03B 17/00
                                                         396/78
10,277,823 B2 *  4/2019   Tsubusaki ......... H04N 5/23222
                                                        348/240.1
(Continued)

FOREIGN PATENT DOCUMENTS

EP    1921843 A2       5/2008
JP    2003-093735 A    4/2003
(Continued)

OTHER PUBLICATIONS

JP 2006/-229322—Y. Damoto et al., Automatic tracking controller and automatic tracking control method and automatic tracking system—Art cited in the IDS but no translation was provided—The Examiner is providing this complete translation instead. CPC class. H04N7/18. publication Aug. 31, 2006. (Year: 2006).*
(Continued)

Primary Examiner — Marly S Camargo
(74) Attorney, Agent, or Firm — Chip Law Group

(57) ABSTRACT

[Object] To provide an information processing device, an information processing method, and a program. [Solution] An information processing device including: an acquisition unit configured to acquire attention information regarding an attention target of a user; and a zoom control unit configured to perform zoom control of a camera on the basis of non-zoom control of the camera and the attention information when the non-zoom control is performed on the basis of the attention information.

15 Claims, 29 Drawing Sheets

(51) Int. Cl.
*G02B 7/08* (2006.01)
*G03B 15/00* (2006.01)

(52) U.S. Cl.
CPC ......... *H04N 5/232* (2013.01); *H04N 5/23218* (2018.08); *H04N 5/23299* (2018.08); *H04N 5/232945* (2018.08)

(58) Field of Classification Search
USPC ............ 348/211.9, 211.99, 211.4, 211.2, 39, 348/208.6, 240.99, 242.1, 240.2, 169, 348/208.14, 113–117, 148; 382/103, 165, 382/170, 181
See application file for complete search history.

(56) References Cited

U.S. PATENT DOCUMENTS

2008/0111891 A1  5/2008  Kurita et al.
2013/0258080 A1*  10/2013  Kuruyama ......... H04N 5/23296 348/65
2014/0022351 A1*  1/2014  Cho ..................... H04N 13/271 348/50
2014/0320702 A1*  10/2014  Tsubusaki .......... H04N 5/23296 348/240.3

FOREIGN PATENT DOCUMENTS

| JP | 2006-229322 A | 8/2006 |
| JP | 2008-124812 A | 5/2008 |
| JP | 2010-088076 A | 4/2010 |
| JP | 2010-272942 A | 12/2010 |

OTHER PUBLICATIONS

International Search Report and Written Opinion of PCT Application No. PCT/JP2017/029709, dated Oct. 10 2017, 10 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/029709 filed on Aug. 21, 2017, which claims priority benefit of Japanese Patent Application No. JP 2016-203349 filed in the Japan Patent Office on Oct. 17, 2016. Each of the above-referenced applications is hereby incorporated herein by reference in its entirety.

TECHNICAL FIELD

The present disclosure relates to an information processing device, an information processing method, and a program.

BACKGROUND ART

In observing an object in a three-dimensional space, a target to which a user pays attention (attention target) is made easier to see by performing zoom control such as enlargement (e.g., Patent Literature 1). In addition, there is a case where viewpoint-related control other than zoom control (hereinafter referred to as non-zoom control in some cases) of changing a viewpoint position, a rotation angle, or the like is performed together with zoom control.

CITATION LIST

Patent Literature

Patent Literature 1: JP 2016-115965A

DISCLOSURE OF INVENTION

Technical Problem

However, in the case where zoom control and non-zoom control are performed together, there has been a concern for difficulty in visually recognizing a user's attention target, such as the attention target falling outside the field of view and the user losing sight of the attention target, for example.

Hence, the present disclosure proposes a novel and improved information processing device, information processing method, and program that can suppress a decrease in visibility of an attention target in the case where zoom control and non-zoom control of a camera are performed.

Solution to Problem

According to the present disclosure, there is provided an information processing device including: an acquisition unit configured to acquire attention information regarding an attention target of a user; and a zoom control unit configured to perform zoom control of a camera on the basis of non-zoom control of the camera and the attention information when the non-zoom control is performed on the basis of the attention information.

In addition, according to the present disclosure, there is provided an information processing method including: acquiring attention information regarding an attention target of a user; and performing, by a processor, zoom control of a camera on the basis of non-zoom control of the camera and the attention information when the non-zoom control is performed on the basis of the attention information.

In addition, according to the present disclosure, there is provided a program causing a computer to implement: a function of acquiring attention information regarding an attention target of a user; and a function of performing zoom control of a camera on the basis of non-zoom control of the camera and the attention information when the non-zoom control is performed on the basis of the attention information.

Advantageous Effects of Invention

According to the present disclosure as described above, a decrease in visibility of an attention target can be suppressed in the case where zoom control and non-zoom control of a camera are performed.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
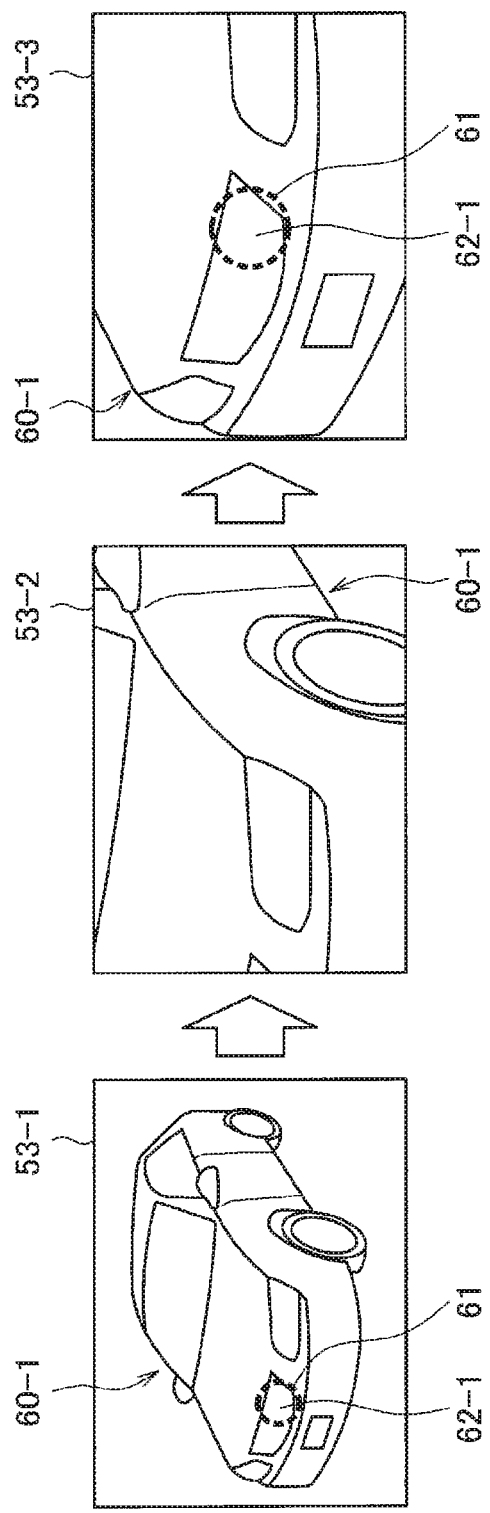
FIG. 1 is an explanatory diagram illustrating an example in which non-zoom control and zoom control are performed substantially simultaneously.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in the present specification and the drawings, structural elements that have substantially the same or similar function and structure are sometimes distinguished from each other using different numbers after the same reference sign. However, when there is no need in particular to distinguish structural elements that have substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Note that description will be given in the following order.
<1. First Embodiment>
<1-1. Overview>
<1-2. Configuration>
<1-3. Operation>
<1-4. Application examples>
<2. Second Embodiment>
<2-1. Configuration>
<2-2. Application examples>
<<3. Hardware configuration example>>
<<4. Conclusion>>

First Embodiment

First, before describing a first embodiment of the present disclosure, a premise configuration of an embodiment according to the present disclosure will be described. In an embodiment of the present disclosure, zoom control of a camera and camera-related control other than zoom control (non-zoom control) for moving a user's attention target (position of interest, region of interest, object of interest, etc.) to a desired position in a field of view of the camera (e.g., the center of the field of view) are performed substantially simultaneously. Performing such control makes it possible to, for example, perform acquisition (capture) or display of an image so that the user's attention target becomes easier to see for the user.

Note that in an embodiment of the present disclosure, the camera may be a virtual camera in a virtual space, or may be a camera in a real space. In addition, in an embodiment of the present disclosure, a field of view of a camera means a range imaged by the camera in a virtual space or a real space.

In addition, in an embodiment of the present disclosure, zoom control may include changing a focal length related to the camera, or changing a relative distance between the camera and the attention target.

For example, in the case where the camera is a virtual camera, the focal length related to the camera may be changed by acquiring (capturing) an image with parameters related to the focal length of the camera changed. In addition, in the case where the camera is a virtual camera, the relative distance between the camera and the attention target may be changed by changing a position of the camera or a position of an object (a virtual object placed in a virtual space) related to the attention target.

In addition, in the case where the camera is a camera in a real space, the focal length of the camera may be changed by lens driving of the camera being controlled, and the relative distance between the camera and the attention target may be changed by a position of the camera being controlled.

In addition, in an embodiment of the present disclosure, non-zoom control may include controlling parallel movement of the camera in a direction perpendicular to an optical axis of the camera, or controlling rotation of the camera. Note that in the case where the camera is a virtual camera in a virtual space, non-zoom control may include controlling relative positions of the camera and an object (a virtual object placed in a virtual space) related to the attention target.

In addition, in an embodiment of the present disclosure, in the case where attention information regarding the user's attention target is obtained, non-zoom control is performed, and the attention target moves to a desired position in the field of view of the camera. Note that described below is an example in which the desired position in the field of view of the camera is the center of the field of view of the camera.

In addition, in an embodiment of the present disclosure, as zoom control of the camera, for example, zoom control in an enlargement direction (zoom-in control) is performed. Performing the above-described non-zoom control and zoom control together (substantially simultaneously) makes it possible to acquire an enlarged image in which the attention target is located at the center.

FIG. 1 is an explanatory diagram illustrating an example in which non-zoom control and zoom control are performed substantially simultaneously. FIG. 1 assumes a case where an object 60-1 is imaged by a camera capable of non-zoom control such as rotation control or parallel movement control. A field of view 53-1 of the camera illustrated in FIG. 1 includes the entire object 60-1.

Here, a case is assumed in which a user observing an image captured by the camera desires to observe a region of interest 61 (an example of the attention target) of the user in more detail in the object 60-1. In such a case, for example, the field of view of the camera is made like a field of view 53-3 by performing non-zoom control in a manner that a centroid 62-1 of the region of interest 61 moves to the center of the field of view and performing zoom control in the enlargement direction, and the user can observe the region of interest 61 in more detail.

Here, as illustrated in FIG. 1, there is a concern that non-zoom control and zoom control of the camera prevents the region of interest 61 from being located in the field of view of the camera (causes the region to move outside the field of view) in a field of view 53-2 during transition of the field of view from the field of view 53-1 to the field of view 53-3. For example, in the case where zoom control is performed faster than non-zoom control, the region of interest 61 is likely to move outside the field of view of the camera. For example, in the case where the camera is a camera in a real space, lens driving control related to zooming is often performed faster than movement, rotation, and the like of the camera. In addition, zoom control may be performed faster than non-zoom control even in a virtual camera in the case where movement speed of the virtual camera is limited for a purpose such as suppressing 3D sickness.

When a region of interest of the user moves outside the field of view, or gets away from the center of the field of view, the user is likely to lose sight of the region of interest, and visibility of the region of interest decreases for the user. Hence, the disclosing party of the present case has devised an embodiment of the present disclosure in view of the above circumstances. According to an embodiment of the present disclosure, a decrease in visibility of an attention target can be suppressed by performing non-zoom control and performing zoom control with limited zoom speed on the basis of attention information regarding the attention target. Hereinafter, an overview of a first embodiment according to the present disclosure having such an effect will be described with reference to FIGS. 2 to 4.

1-1. Overview

In the first embodiment according to the present disclosure, while zoom control and non-zoom control are being performed, zoom control is performed in a manner that a decrease in visibility of an attention target is suppressed. For example, performing zoom control in which zoom speed of a camera is limited in a manner that the attention target is located in a field of view of the camera at all times makes it less likely for a user to lose sight of the attention target, and a decrease in visibility of the attention target can be suppressed. Described below with reference to FIGS. 2 to 4 are conditions of the zoom speed of the camera under which the attention target is located in the field of view of the camera in the case where zoom control and non-zoom control are performed substantially simultaneously.

Figure 2:
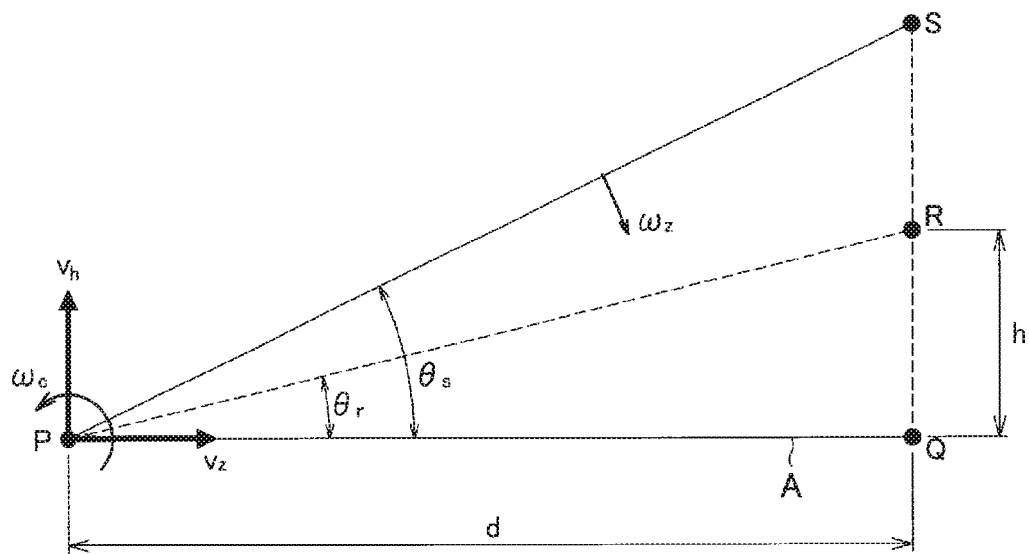
FIG. 2 is an explanatory diagram for describing a condition of zoom speed of a camera under which an attention target is located in a field of view of the camera.
Figure 3:
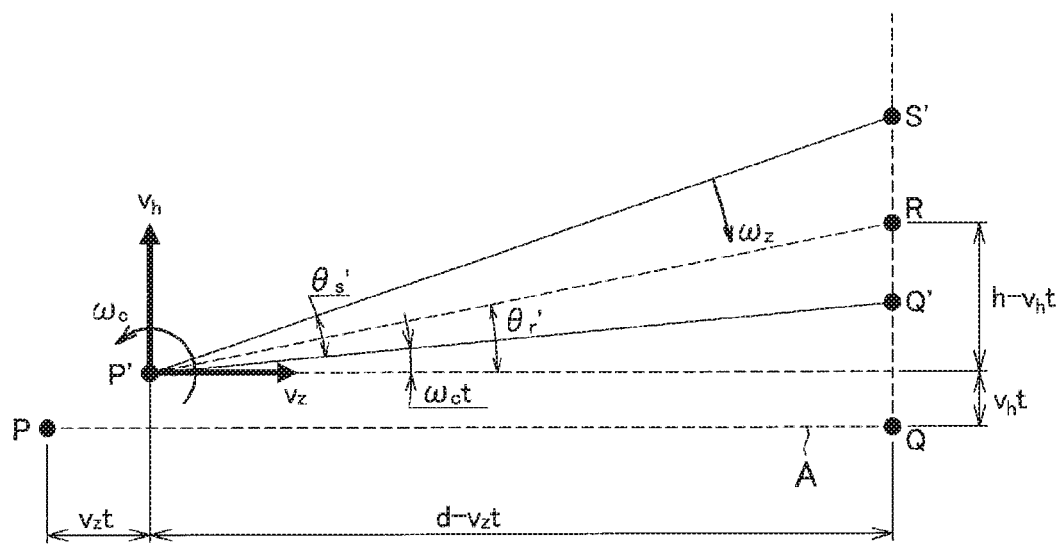
FIG. 3 is an explanatory diagram for describing a condition of zoom speed of a camera under which an attention target is located in a field of view of the camera.
Figure 4:
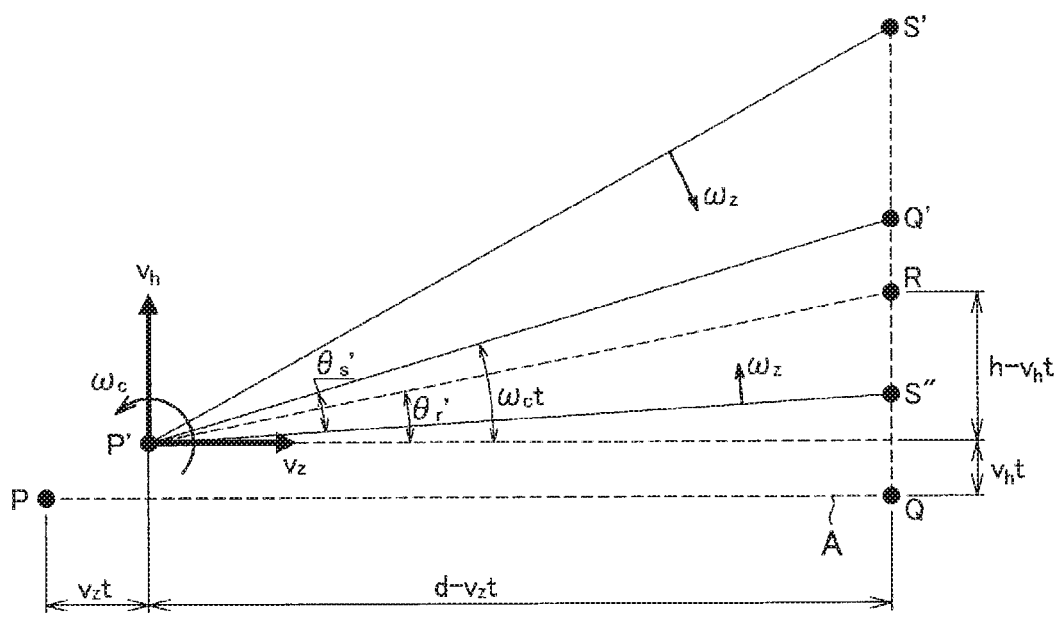
FIG. 4 is an explanatory diagram for describing a condition of zoom speed of a camera under which an attention target is located in a field of view of the camera.

FIGS. 2 to 4 are explanatory diagrams for describing conditions of zoom speed of a camera under which an attention target is located in a field of view of the camera.

FIG. 2 illustrates a positional relationship between the camera at time T=0 of zoom control (e.g., a start time of zoom control) and the user's attention target. In FIG. 2, point P indicates a camera position (viewpoint position) at time T=0, and point R indicates a position of a point of interest (an example of the attention target) that is moved to the center of the field of view. In addition, point Q indicates an intersection of a line drawn from point R perpendicularly to an optical axis A of the camera at time T=0 and the optical axis A. In addition, point S indicates an intersection of a straight line passing through point Q and point R and an angle-of-view range of the camera at time T=0.

In addition, in FIG. 2, an angle $\theta_S$ indicates an angle of view of the camera at time T=0, and an angle $\theta_r$ indicates an angle formed by the optical axis A of the camera at time T=0 and a straight line connecting point P and point R. In addition, as illustrated in FIG. 2, d is a distance from point P to point Q in an optical axis direction of the camera (depth direction), and h is a height from the optical axis A of the camera at time T=0 to point Q.

In addition, FIG. 2 illustrates, as parameters related to zoom speed control, a camera parallel movement speed $v_Z$ in the optical axis direction of the camera (z-axis direction) and an angle-of-view change speed $\omega_Z$. In addition, FIG. 2 illustrates, as parameters related to non-zoom control, a camera rotation speed $\omega_C$ and a camera parallel movement speed $v_h$ in a direction perpendicular to the optical axis. Note that the camera parallel movement speed may be relative movement speeds of the camera and the attention target (change speed of the relative distance).

FIG. 3 illustrates a positional relationship between the camera at time T=t and the user's attention target. In FIG. 3, point P', point Q', and point R' are points corresponding to point P, point Q, and point R, respectively, at time T=t. Note that in a period from time T=0 to time T=t, the above parameters related to zoom control and non-zoom control are not changed.

Here, according to FIGS. 2 and 3, the angle-of-view change speed $\omega_Z$ or the camera parallel movement speed $v_Z$ needs to satisfy a predetermined condition in order that a gaze point R is present in the angle-of-view range (field of view) of the camera in a period during which zoom control and non-zoom control are performed. More specifically, in FIG. 3, it is sufficient if a relationship of $\angle S'P'Q' \geq \angle RP'Q'$ is satisfied. Consequently, the following expression (1) is obtained by using an angle $\theta_{S'}$, an angle $\theta_{r'}$ and an angle $\omega_C t$ illustrated in FIG. 3.

[Math. 1]

$$\theta_{S'} \geq \theta_{r'} - \omega_C t \qquad (1)$$

In addition, the angle $\theta_{S'}$ and the angle $\theta_{r'}$ can be expressed respectively by the following expressions (2) and (3).

[Math. 2]

$$\theta'_s = \theta_s - \omega_z t \quad (2)$$

$$\theta'_r = \mathrm{atan}\left(\frac{h - v_h t}{d - v_z t}\right) \quad (3)$$

The expressions (1) to (3) are rearranged about the angle-of-view change speed $\omega_Z$; thus, the following expression (4) indicating a condition is obtained.

[Math. 3]

$$\omega_z \leq \frac{\theta_s - \mathrm{atan}\left(\frac{h - v_h t}{d - v_z t}\right)}{t} + \omega_c \quad (4)$$

Consequently, performing zoom control at a zoom speed such that the angle-of-view change speed $\omega_Z$ satisfies the expression (4) makes it possible to perform zoom control in a manner that the point of interest R is present in the field of view of the camera in a period from time T=0 to time T=t.

Note that the expression (4) is a condition in the case where zoom control includes both changing the focal length of the camera (changing the angle of view of the camera) and changing the relative distance between the camera and the attention target (parallel movement of the camera in the optical axis direction). In the case where zoom control does not include changing the relative distance between the camera and the attention target, the camera parallel movement speed $v_Z$ in the optical axis direction of the camera can be assumed to be 0; hence, the expression (4) can be transformed into the following expression (5) indicating a condition.

[Math. 4]

$$\omega_z \leq \frac{\theta_s - \mathrm{atan}\left(\frac{h - v_h t}{d}\right)}{t} + \omega_c \quad (5)$$

In addition, the expression (4) is a condition in the case where non-zoom control includes both parallel movement control and rotation control of the camera. Note that it is sufficient if non-zoom control includes at least one of parallel movement control or rotation control of the camera. Here, in the case where non-zoom control includes only parallel movement control of the camera, the camera rotation speed $\omega_C$ can be assumed to be 0; hence, the expression (4) can be transformed into the following expression (6) indicating a condition.

[Math. 5]

$$\omega_z \leq \frac{\theta_s - \mathrm{atan}\left(\frac{h - v_h t}{d - v_z t}\right)}{t} \quad (6)$$

On the other hand, in the case where non-zoom control and zoom control include only rotation control of the camera, the camera parallel movement speeds $v_Z$ and $v_h$ can each be assumed to be 0; hence, the expression (4) can be transformed into the following expression (7) indicating a condition.

[Math. 6]

$$\omega_z \leq \frac{\theta_s - \mathrm{atan}\left(\frac{h}{d}\right)}{t} + \omega_c \quad (7)$$

In addition, in the case where zoom control includes parallel movement control of the camera in the optical axis direction of the camera, zoom control is performed to satisfy a condition about the camera parallel movement speed $v_Z$ in the optical axis direction of the camera. It is sufficient if a relationship of QR≤QS' is satisfied in FIG. 3 in order that the gaze point R is present in the angle-of-view range (field of view) of the camera in a period during which zoom control and non-zoom control are performed; hence, the following expression (8) is obtained.

[Math. 7]

$$h \leq v_h t + (d - v_z t)\tan(\delta_s - \omega_z t + \omega_c t) \quad (8)$$

The expression (8) is rearranged about the camera parallel movement speed $v_Z$ in the optical axis direction of the camera; thus, the following expression (9) indicating a condition is obtained.

[Math. 8]

$$v_z \leq \frac{1}{t}\left(\frac{v_h t - h}{\tan(\theta_s - \omega_z t + \omega_c t)} + d\right) \quad (9)$$

Consequently, performing zoom control at a zoom speed such that the camera parallel movement speed $v_Z$ in the optical axis direction of the camera satisfies the expression (9) makes it possible to perform zoom control in a manner that the point of interest R is present in the field of view of the camera in a period from time T=0 to time T=t.

Note that in the case where the angle of view of the camera is fixed (in the case where zoom control does not include control to change the focal length), the angle-of-view change speed $\omega_Z$ can be assumed to be 0; hence, the expression (9) can be transformed into the following expression (10) indicating a condition.

[Math. 9]

$$v_z \leq \frac{1}{t}\left(\frac{v_h t - h}{\tan(\theta_s + \omega_c t)} + d\right) \quad (10)$$

In addition, in the present embodiment, zoom control may be performed in a manner that the point of interest R does not go past the center of the field of view. FIG. 4 is an explanatory diagram for describing an example of the case where zoom control is performed in a manner that the point of interest R does not go past the center of the field of view at time T=t. Point S" in FIG. 4 is an intersection of an angle-of-view range symmetrical to S' with respect to the optical axis of the camera and a straight line passing through point Q and point R.

To prevent the gaze point R from going past the center of the field of view of the camera, it is sufficient if a relationship of ∠RP'Q'≥0 is satisfied in FIG. 4; hence, a relationship of the following expression (11) is obtained.

[Math. 10]

$$\mathrm{atan}\left(\frac{h-v_h t}{d-v_z t}\right)-\omega_c t \geqq 0 \quad (11)$$

The expression (11) is rearranged about $\omega_C$; thus, the expression (11) is transformed into the following expression (12) indicating a condition.

[Math. 11]

$$\omega_c \leqq \frac{1}{t}\mathrm{atan}\left(\frac{h-v_h t}{d-v_z t}\right) \quad (12)$$

To prevent the gaze point R from going past the center of the field of view of the camera, it is sufficient if zoom control is performed to satisfy the expression (12).

Note that in order that the gaze point R may go past the center of the field of view and is present in the field of view, it is sufficient if ∠Q'P'R≤∠Q'P'S" is satisfied in FIG. 4; hence, a relationship of the following expression (13) is obtained.

[Math. 12]

$$\omega_c t - \mathrm{atan}\left(\frac{h-v_h t}{d-v_z t}\right) \leqq \theta_s - \omega_z t \quad (13)$$

The expression (13) is rearranged about $\omega_C$; thus, the expression (13) is transformed into the following expression (14) indicating a condition.

[Math. 13]

$$\omega_c \leqq \frac{1}{t}\left(\theta_s - \omega_z t + \mathrm{atan}\left(\frac{h-v_h t}{d-v_z t}\right)\right) \quad (14)$$

Note that t may be a minute period, and may be an update interval of control parameters, for example. In other words, zoom control may be performed to satisfy the above-described condition for each period t. For example, performing zoom control while updating control parameters to satisfy the condition of the expression (4) makes it possible to perform zoom control in a manner that the point of interest R is present in the field of view of the camera at all times.

In addition, the camera parallel movement speed $v_h$ in the direction perpendicular to the optical axis may be a speed component in one direction of two directions (e.g., an x-axis direction and a y-axis direction perpendicular to each other). In the case where the camera parallel movement speed $v_h$ is a speed component in one direction, a condition similar to the condition described above is obtained also for a speed component in a direction that is perpendicular to the camera parallel movement speed $v_h$ and perpendicular to the optical axis, and zoom control may be performed to satisfy both of the conditions.

In addition, in the case where the attention target is a region of interest, for example, it is sufficient if the above condition is satisfied for all points in the region of interest. In addition, in the case where the attention target is an object of interest, it is sufficient if the above condition is satisfied for all points in a region corresponding to the object of interest in the field of view of the camera.

The overview of the first embodiment according to the present disclosure has been described above. Next, a configuration example of the first embodiment according to the present disclosure for achieving the zoom control described above will be described below. Note that the first embodiment of the present disclosure mainly describes an example in which a virtual object prepared in advance and being present in a virtual space is imaged by a virtual camera.

1-2. Configuration (Overall Configuration)

Figure 5:
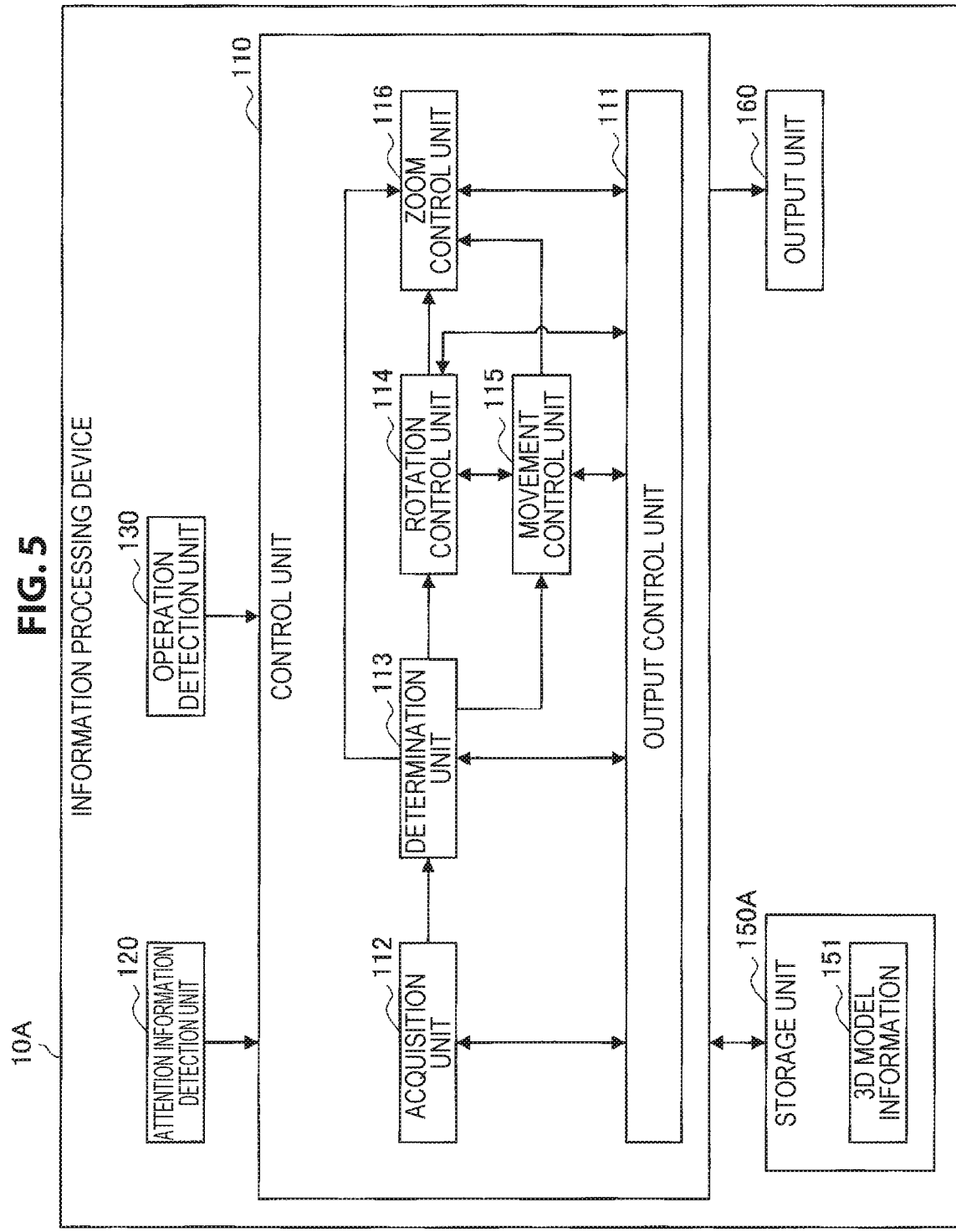
FIG. 5 is a diagram illustrating a functional configuration example of an information processing device according to a first embodiment of the present disclosure.

FIG. 5 is a diagram illustrating a functional configuration example of an information processing device according to the first embodiment of the present disclosure. As illustrated in FIG. 5, an information processing device 10A according to the present embodiment includes a control unit 110, an attention information detection unit 120, an operation detection unit 130, a storage unit 150A, and an output unit 160.

Note that, in the present specification, an example in which the control unit 110, the attention information detection unit 120, the operation detection unit 130, the storage unit 150A, and the output unit 160 are within the same device (information processing device 10A) will be mainly described. However, the positions of these blocks are not particularly limited. For example, the output unit 160 may be a device provided separately from the information processing device 10A. In addition, as will be described later, some of these blocks may be in a server or the like.

The control unit 110 executes the control of each unit of the information processing device 10A. As illustrated in FIG. 5, the control unit 110 includes an output control unit 111, an acquisition unit 112, a determination unit 113, a rotation control unit 114, a movement control unit 115, and a zoom control unit 116. Details of these functional blocks will be described later. Note that the control unit 110 may be constituted by, for example, a central processing unit (CPU) or the like. In a case in which the control unit 110 is constituted by a processing device such as a CPU, such a processing device may be constituted by an electronic circuit.

The attention information detection unit 120 can detect attention information regarding an attention target of a user (hereinafter, also simply referred to as "attention information") in a three-dimensional space. In the present specification, a case in which a line of sight of a user is used as attention information will be mainly described. Here, a line of sight of the user may be detected in any manner. As an example, a line of sight of the user may be detected on the basis of an eye region seen in an image captured by an imaging device in a case in which the attention information detection unit 120 includes the imaging device. However, the attention information is not limited to a line of sight of the user.

For example, the attention information may be detected on the basis of a detection result obtained by a motion sensor detecting a movement of the user (attention information having a position in a three-dimensional space detected by the motion sensor as a destination may be detected). The motion sensor may detect acceleration through an acceleration sensor or may detect an angular velocity through a gyro sensor (for example, a ring-type gyro mouse or the like). Alternatively, the attention information may be detected on the basis of a detection result obtained by a tactile type device. An example of the tactile type device is a pen-type tactile device.

Alternatively, the attention information may be a direction indicated by a predetermined object (for example, a direction indicated by a tip end of a bar, or the like), or may be a direction indicated by a user's finger. The direction indicated by the predetermined object and the direction indicated by the user's finger may be detected on the basis of an object and a finger which are seen in an image captured by an imaging device in a case in which the attention information detection unit 120 includes the imaging device. Alternatively, the attention information may be detected on the basis of a result of recognition of a user's face. For example, in a case in which the attention information detection unit 120 includes an imaging device, a center position between the eyes may be recognized on the basis of an image obtained by the imaging device, and a straight line extending from the center position between the eyes may be detected as attention information.

Alternatively, the attention information may be detected on the basis of a recognition result of a marker. For example, in a case in which a two-dimensional marker is disposed in a three-dimensional space and the attention information detection unit 120 includes a visible light camera, attention information may be detected on the basis of the position of the two-dimensional marker seen in an image obtained by imaging performed by the visible light camera. Further, in a case in which an infrared reflection marker is disposed in a three-dimensional space and the attention information detection unit 120 includes an infrared camera, attention information may be detected on the basis of the position of the infrared reflection marker seen in an image obtained by imaging infrared reflected light in the infrared reflection marker by the infrared camera.

Alternatively, attention information may be detected on the basis of a sound recognition result. For example, in a case in which a plurality of objects is present in the field of view of the camera, the user may utter an utterance referring to one object among the plurality of objects. In this manner, text data is obtained as a sound recognition result for such an utterance, and attention information indicating that the one object is the attention target may be detected on the basis of the text data.

Alternatively, in a case in which attention information can be detected at the same time by a plurality of methods, any one of the plurality of methods may be selected as an object to be used. For example, a method having the highest accuracy of detection of attention information (for example, a detection method based on a result of recognition of a marker, or the like) among the plurality of methods may be selected as an object to be used. In this case, the accuracy of detection may be determined in advance or may be calculated at different times. Alternatively, the most intuitive direction instruction method (for example, a line-of-sight detection method or the like) among the plurality of methods may be selected as an object to be used.

The operation detection unit 130 can detect an operation input by a user. For example, in the present specification, a start operation of non-zoom control and zoom control (a control start operation) are given as an example of operations input by a user. Here, the control start operation may be detected in any manner. For example, the control start operation may be an operation on a switch, a lever, a button, and the like, or may be detected on the basis of the speech or the like of a user.

Alternatively, the control start operation may be detected on the basis of the position (for example, the position of the head, or the like) and posture (for example, the posture of the whole body, or the like) of a user's body, or the like. In addition, the object rotation and moving operations may be detected through myoelectricity (for example, myoelectricity of the jaw, myoelectricity of an arm, or the like), or may be detected through brain waves.

The storage unit 150A is a recording medium that stores a program executed by the control unit 110 or stores data necessary for the execution of the program. In addition, the storage unit 150A temporarily stores data in order to perform an arithmetic operation by the control unit 110. The storage unit 150A may be a magnetic storage unit device, a semiconductor storage device, an optical storage device, or a magneto-optical storage device. In particular, in the first embodiment of the present disclosure, the storage unit 150A stores information regarding a three-dimensional model that is an example of a virtual object (for example, information such as the shape, size, position, direction, and the like of the three-dimensional model) as 3D model information 151.

The output unit 160 outputs various pieces of information. For example, the output unit 160 may include a display capable of performing display capable of being visually recognized by a user, and the display may be a projector, a liquid crystal display, or an organic electro-luminescence (EL) display. In addition, the output unit 160 may include a sound output device. Alternatively, the output unit 160 may include a tactile presentation device that presents a tactile sensation to a user. Note that the output control unit 111 described later may include, as separate output control units, a first output control unit that directly controls the output unit 160 and a second output control unit that directly or indirectly controls display displayed by the output unit 160.

(Functional Details)

Figure 6:
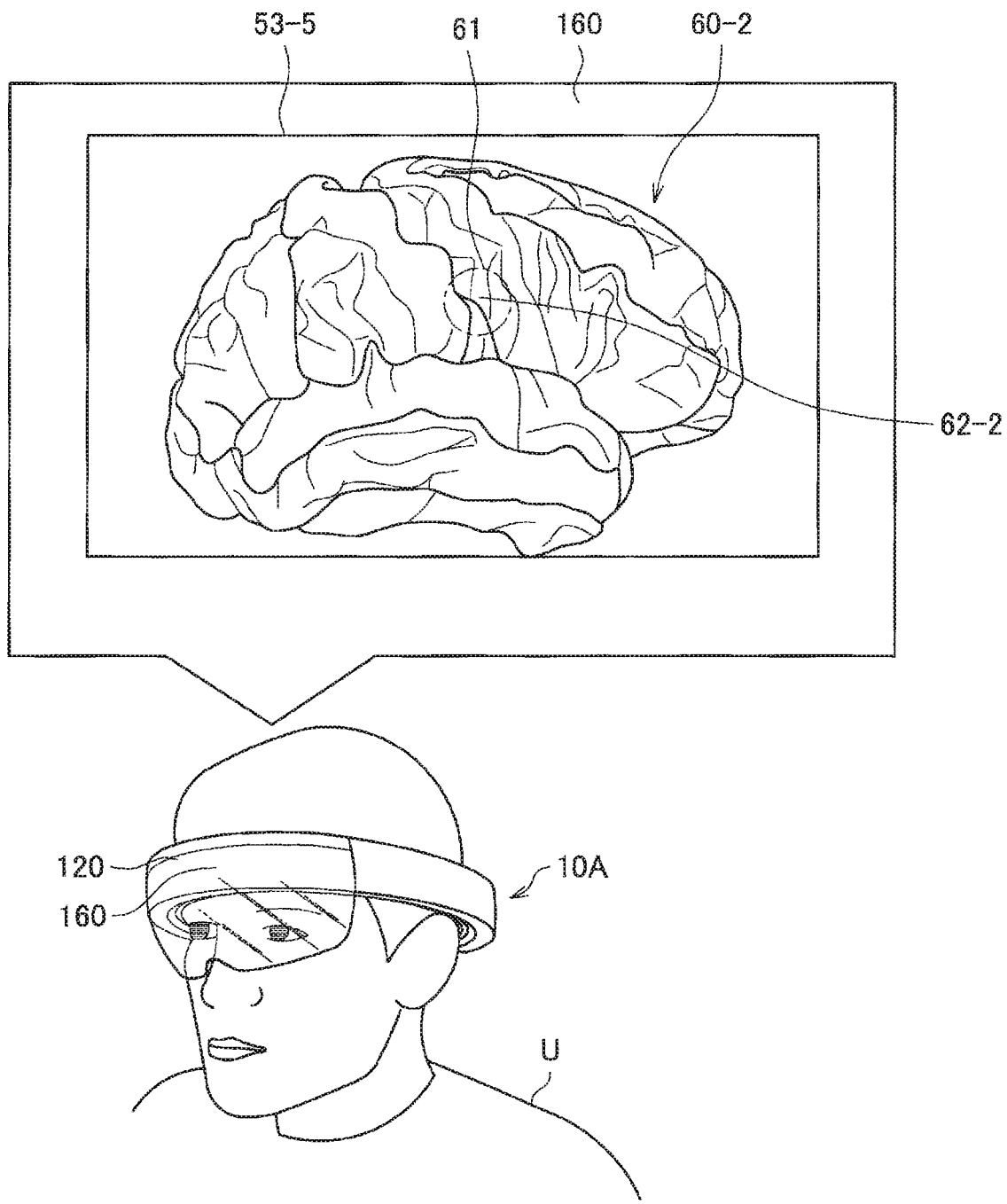
FIG. 6 is a diagram illustrating a first example of an information processing device 10A according to the embodiment.
Figure 7:
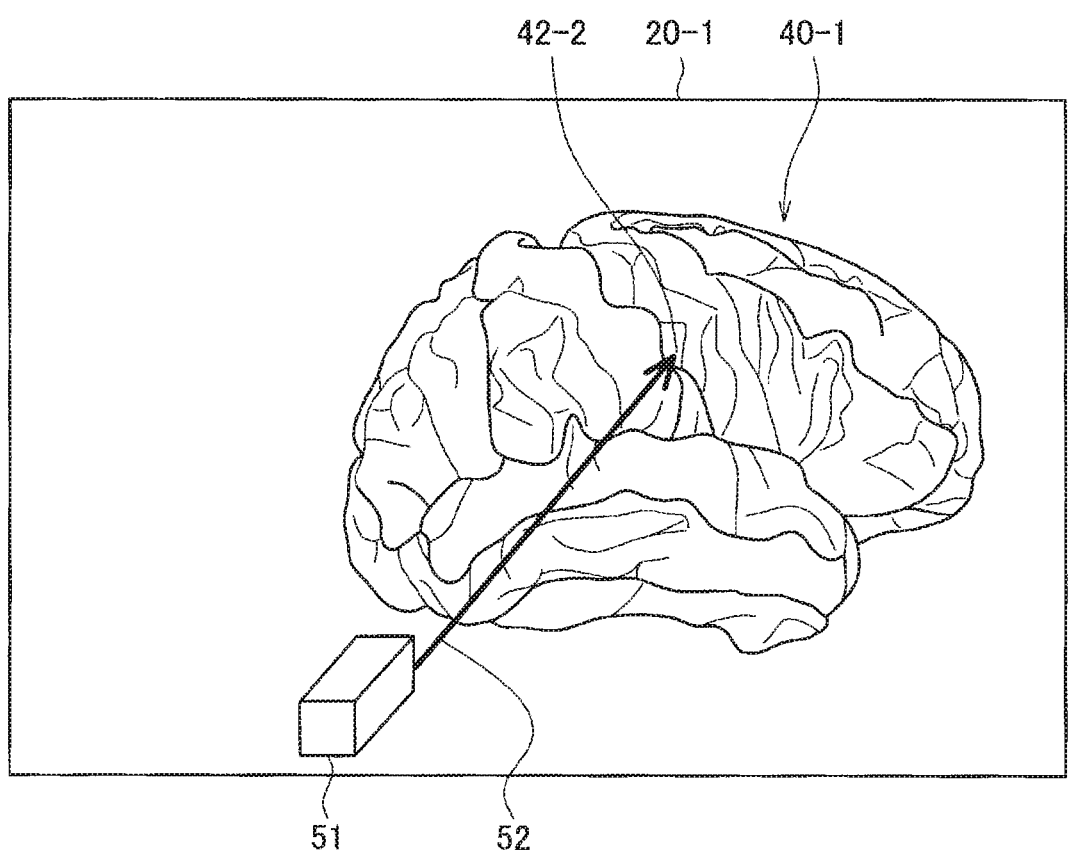
FIG. 7 is a diagram illustrating an example of a virtual object in a virtual space in the first example of the information processing device 10A according to the embodiment.

The overall functional configuration example of the information processing device 10A according to the first embodiment of the present disclosure has been described above. Next, details of a function of the information processing device 10A according to the first embodiment of the present disclosure will be described. FIG. 6 is a diagram illustrating a first example of the information processing device 10A according to the first embodiment of the present disclosure. FIG. 7 is a diagram illustrating an example of a virtual object in a virtual space in the first example of the information processing device 10A according to the first embodiment of the present disclosure. As illustrated in FIG. 6, the information processing device 10A is worn on the head of a user U, and includes the attention information detection unit 120 and the output unit 160.

As illustrated in FIG. 6, in the first example, a case in which the information processing device 10A is a head mounted display (HMD) for augmented reality (AR) is mainly assumed. However, the information processing device 10A is not limited to the HMD for AR. For example, the information processing device 10A may be an HMD for virtual reality (VR), a television device, a personal computer (PC), a smart phone, or any other electronic apparatus.

Referring to FIG. 7, a virtual object 40-1 is present in a virtual space 20-1, and a viewpoint camera 51 is virtually present in a virtual space 20-1. In addition, an image obtained by imaging the virtual object 40-1 by the viewpoint camera 51 is displayed by the output unit 160 under the control of the output control unit 111, so that a field of view 53-5 is provided to the user U. In the example illustrated in FIG. 6, a 3D model of a brain is shown as an example of a virtual object 60-2 seen in the field of view 53-1.

Here, a case in which the user U having observed the field of view 53-5 desires to observe the region of interest 61 of the user U in more detail is assumed. In such as case, for example, the user can observe the region of interest 61 in more detail by performing non-zoom control in a manner that a centroid 62-2 of the region of interest 61 moves to the center of the field of view and performing zoom control in the enlargement direction.

An example in which visibility of the attention target 62-2 is caused to decrease by zoom control has been described above with reference to FIG. 1. On the other hand, in the first embodiment of the present disclosure, the attention information detection unit 120 detects a line of sight of the user U in a real space, and detects a line of sight 52 of the user U in the virtual space 20-1 which corresponds to the line of sight of the user U in the real space as an example of attention information of the user U. In addition, the acquisition unit 112 acquires the line of sight 52 of the user U in the virtual space 20-1 as attention information regarding the attention target of the user and acquires the position of the virtual object 40-1 in the virtual space 20-1 from the 3D model information 151.

In this case, the determination unit 113 determines the attention target and a point (hereinafter referred to as movement reference point) to be moved to the center of the field of view (an example of a desired position in the field of view) on the basis of the position of the virtual object 40-1 in the virtual space 20-1 and the line of sight of the user U in the virtual space 20-1. For example, the determination unit 113 may determine an intersection of the line of sight 52 of the user U in the virtual space 20-1 and the surface of the virtual object 40-1 as the attention target (point of interest), or may determine a region in the vicinity of the intersection as the attention target (region of interest). In addition, FIG. 7 illustrates the line of sight 52 of the user U in the virtual space 20-1, and illustrates an example in which the determination unit 113 determines an intersection between the line of sight 52 of the user U in the virtual space 20-1 and the surface of the virtual object 40-1 as a movement reference point 42-2. In the field of view 53-1, a movement reference point 62-2 is seen as a point corresponding to the movement reference point 42-2 in the virtual space 20-1. Note that the determination of the movement reference point 42-2 by the determination unit 113 is not limited to such an example, and for example, the determination unit 113 may determine a centroid position of the region of interest as the movement reference point 42-2.

The rotation control unit 114 and the movement control unit 115 perform non-zoom control of the viewpoint camera 51 on the basis of attention information. In this specification, the rotation control unit 114 and the movement control unit 115 perform non-zoom control in a manner that the movement reference point 42-2 moves to the center of the field of view. The rotation control unit 114 performs control to rotate the viewpoint camera 51, and the movement control unit 115 performs control to move the viewpoint camera 51 in parallel in a direction perpendicular to an optical axis of the viewpoint camera 51. Note that the movement control unit 115 may perform non-zoom control to change the relative distance between the virtual object 40-1 and the viewpoint camera 51 by moving the virtual object 40-1 in parallel in the direction perpendicular to the optical axis of the viewpoint camera 51.

For example, the control to rotate the viewpoint camera 51 by the rotation control unit 114 may be control based on the camera rotation speed c described with reference to FIGS. 2 to 4. In addition, the control to move the viewpoint camera 51 in parallel by the movement control unit 115 may be control based on the camera parallel movement speed $v_h$ described with reference to FIGS. 2 to 4.

The zoom control unit 116 performs zoom control of the camera on the basis of non-zoom control and attention information when non-zoom control by the rotation control unit 114 and the movement control unit 115 is performed.

For example, the zoom control unit 116 may control zoom speed as described with reference to FIGS. 2 to 4. Zoom control may be performed by controlling zoom speed of the camera on the basis of parameters related to non-zoom control.

The zoom control unit 116 may control zoom speed in a manner that the angle-of-view change speed $\omega_z$ or the parallel movement speed $v_z$ in the optical axis direction of the camera, which is related to zoom speed, satisfies at least one of the above expressions (4) to (7), (9), (10), (12), or (14) indicating conditions.

Such a configuration makes it less likely for the user U to lose sight of the attention target, and a decrease in visibility of the attention target can be suppressed.

Note that zoom control by the zoom control unit 116 may be performed substantially simultaneously with non-zoom control by the rotation control unit 114 and the movement control unit 115. In addition, non-zoom control and zoom control by the rotation control unit 114, the movement control unit 115, and the zoom control unit 116 may be started substantially simultaneously on the basis of a control start operation by the user that is detected by the operation detection unit 130 described with reference to FIG. 5, and performed substantially simultaneously. In addition, non-zoom control and zoom control may be started automatically regardless of a control start operation by the user U.

In the above, an example in which non-zoom control and zoom control of a camera are performed has been described. Incidentally, although an example in which the attention information detection unit 120 detects a line of sight of a user has been described above, a line of sight of a user may not be detected by the attention information detection unit 120. For example, in a case in which the attention information detection unit 120 includes an imaging device, an eye region may not fall within an imaging range of the imaging device, or a line of sight may not be detected due to the eye region being unclearly seen in an image.

Consequently, in a case in which a line of sight of the user is not detected, the output control unit 111 may control the output of information indicating that a line of sight is not detected. The information indicating that a line of sight is not detected may be output by a display as visual information, may be output by a sound output device as sound information, or may be output by a tactile presentation device as tactile information.

In addition, zoom control of the camera may be performed not by the automatic control described above, but on the basis of a user operation detected by the operation detection unit 130. In such a case, there is a concern that visibility of the attention target decreases depending on the user operation; hence, the zoom control unit 116 may impose a limitation in zoom speed of the camera on the user operation. The limitation in zoom speed of the camera imposed on the user operation may be similar to the limitation in zoom speed in the automatic control described above.

In addition, the output control unit 111 may cause a guide related to a zoom operation on the camera by the user to be output (e.g., displayed). For example, in the case where a limitation in zoom speed of the camera is imposed on the user operation, the output control unit 111 may cause a guide indicating that zoom speed is limited or a guide indicating a limit of zoom speed to be displayed. Examples of the guide will be described later with reference to FIGS. 22 and 23.

An example (first example) of the configuration of the information processing device 10A according to the first embodiment of the present disclosure has been described above. Another example of the information processing device 10A according to the first embodiment of the present disclosure will be described later with reference to FIGS. 9 to 13 as application examples.

1-3. Operation

Figure 8:
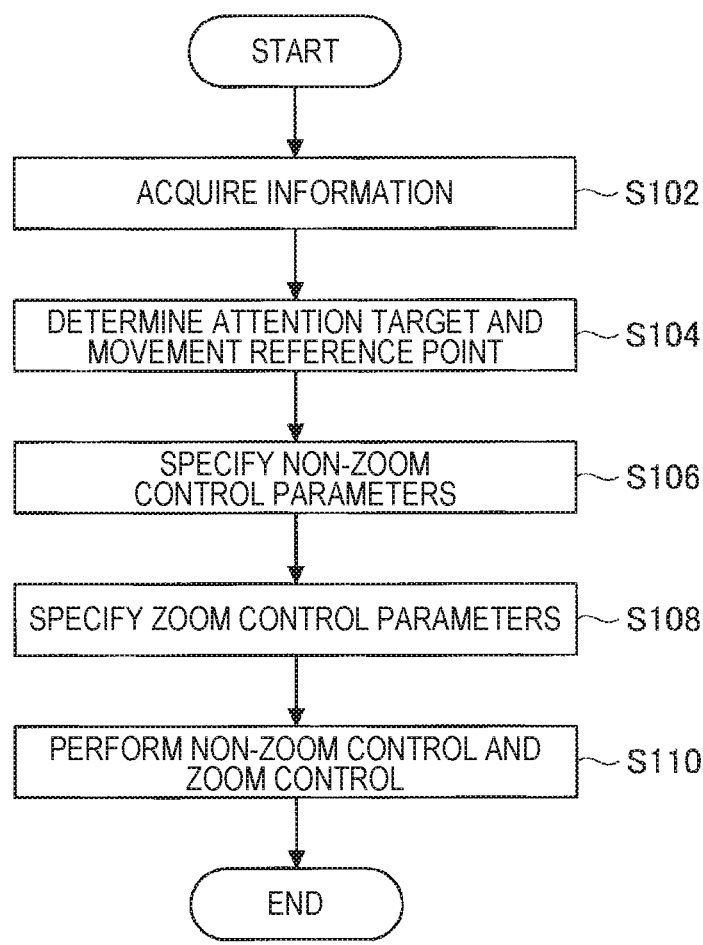
FIG. 8 is a flowchart illustrating an operation example of the information processing device 10A according to the embodiment.

Next, an operation example of the information processing device 10A according to the first embodiment of the present disclosure will be described. FIG. 8 is a flowchart illustrating the operation example of the information processing device 10A according to the present embodiment. First, the acquisition unit 112 acquires attention information of the user (e.g., the line of sight of the user) detected by the attention information detection unit 120, and acquires a position of a virtual object from the 3D model information 151 (S102).

Subsequently, the determination unit 113 determines the attention target and a movement reference point on the basis of the attention information (S104). The rotation control unit 114 and the movement control unit 115 specify parameters related to non-zoom control on the basis of the movement reference point in step S104 (S106). Subsequently, the zoom control unit 116 specifies parameters related to zoom control on the basis of the attention target and the parameters related to non-zoom control (S108).

Subsequently, the rotation control unit 114, the movement control unit 115, and the zoom control unit 116 perform non-zoom control and zoom control substantially simultaneously (S110).

The operation example of the information processing device 10A according to the present embodiment has been described above. Note that the processing in steps S102 to S110 described above may be performed repeatedly for each period t described with reference to FIGS. 2 to 4, for example, and control parameters may be updated.

1-4. Application Examples

The example (first example) of the information processing device 10A according to the first embodiment of the present disclosure has been described above; however, the information processing device 10A according to the first embodiment of the present disclosure can also be applied to examples other than the above. Described below with reference to FIGS. 9 to 13 as application examples are some other examples of the information processing device 10A according to the first embodiment of the present disclosure.

Figure 9:
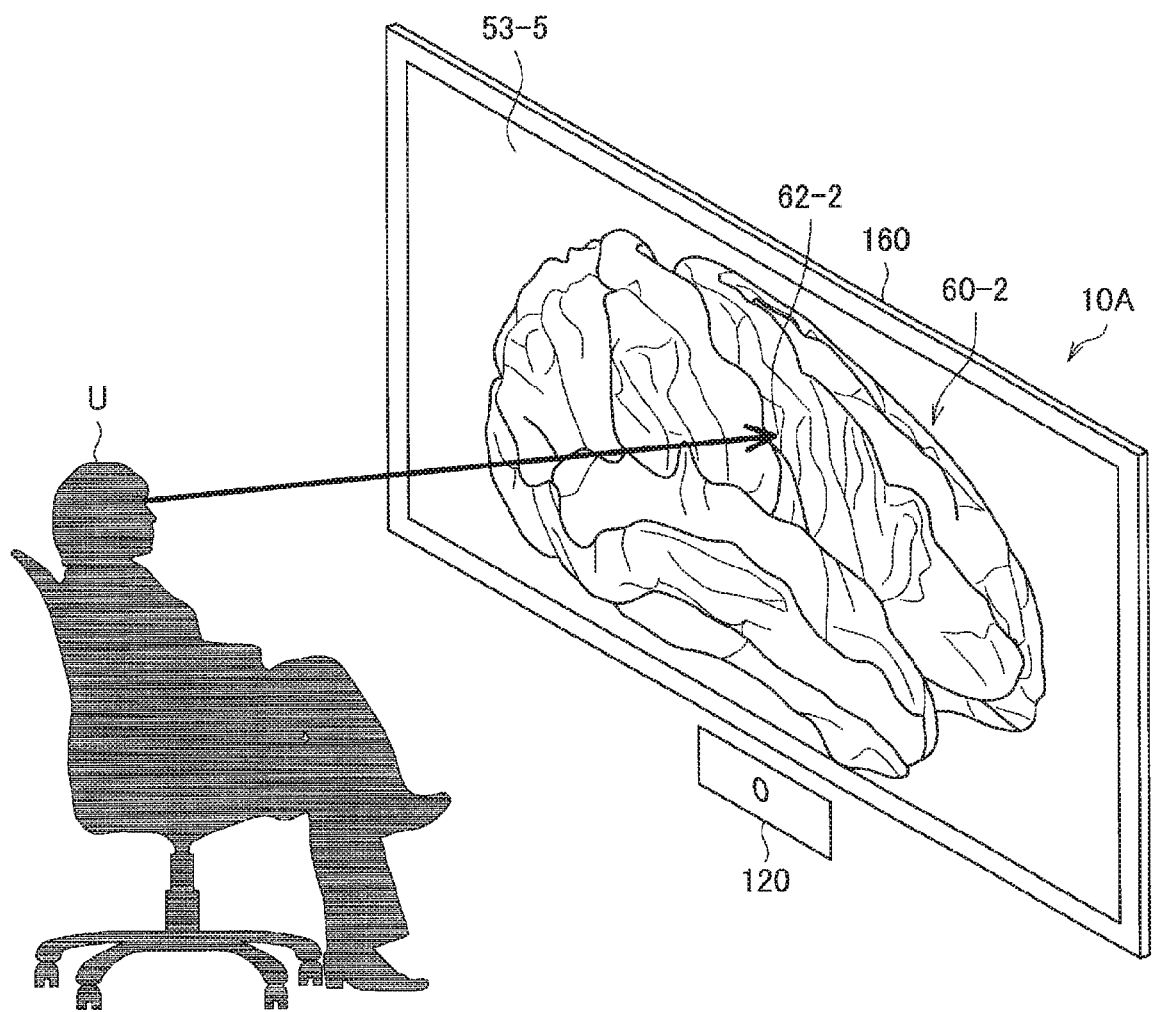
FIG. 9 is a diagram illustrating a second example of the information processing device 10A according to the embodiment.
Figure 10:
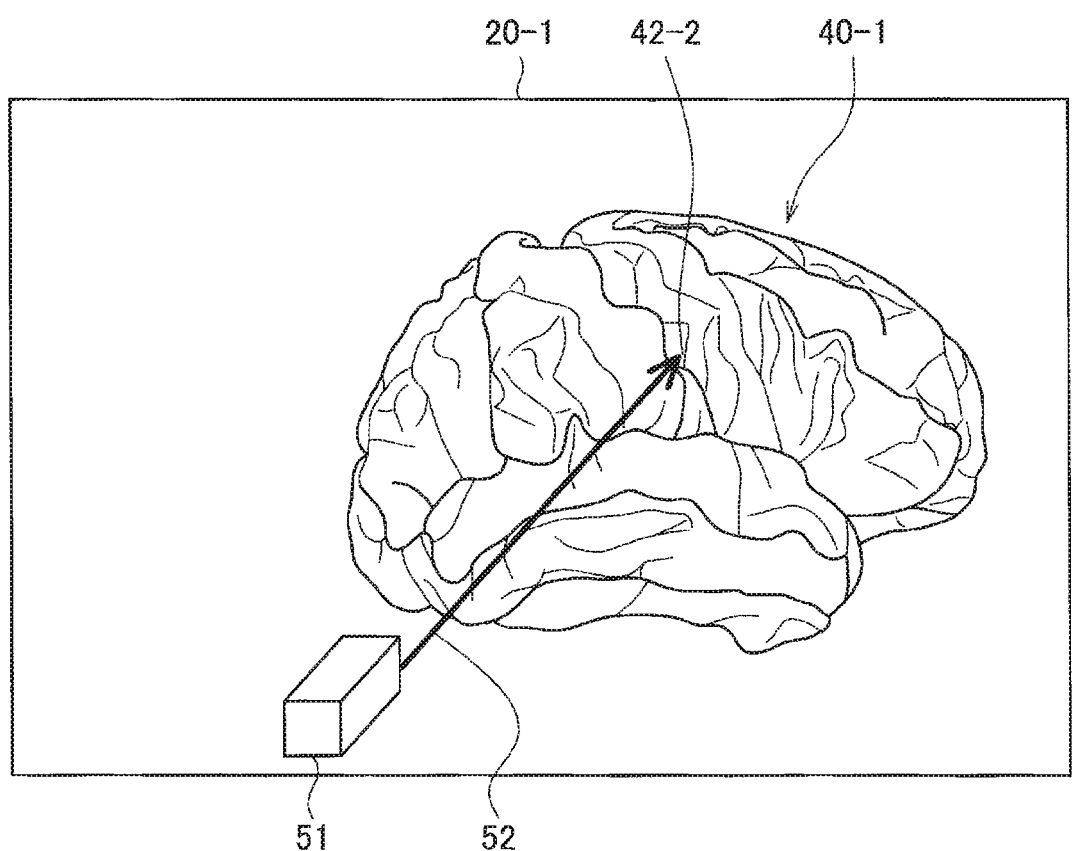
FIG. 10 is a diagram illustrating an example of a virtual object in a virtual space in the second example of the information processing device 10A according to the embodiment.

FIG. 9 is a diagram illustrating a second example of the information processing device 10A according to the first embodiment of the present disclosure. FIG. 10 is a diagram illustrating an example of a virtual object in a virtual space in the second example of the information processing device 10A according to the first embodiment of the present disclosure. As illustrated in FIG. 9, the information processing device 10A is installed in a room where a user U is present, and includes the attention information detection unit 120 and the output unit 160.

As illustrated in FIG. 9, in the second example, a case in which the information processing device 10A is a television device is mainly assumed. Referring to FIG. 10, a virtual object 40-1 and a viewpoint camera 51 are virtually present in a virtual space 20-1. In addition, an image obtained by imaging the virtual object 40-1 by the viewpoint camera 51 is displayed by the output unit 160 under the control of the output control unit 111, so that the field of view 53-5 is provided to the user U. Referring to FIG. 9, a 3D model of a brain is illustrated as an example of the virtual object 60-2 seen in the field of view 53-5.

Also in the second example, the attention information detection unit 120 detects a line of sight of the user U in a real space, and detects a line of sight 52 of the user U in the virtual space 20-1 corresponding to the line of sight of the user U in the real space as an example of attention information of the user U. In this case, in the second example, the attention information detection unit 120 detects a point of interest of the user U in the field of view 53-5 on the basis of the line of sight of the user U in the real space, and detects the line of sight 52 of the user U in the virtual space 20-1 corresponding to the point of interest of the user U in the field of view 53-5 as an example of attention information of the user U. Also in the second example, non-zoon control and zoom control of the viewpoint camera 51 are performed as in the first example.

Figure 11:
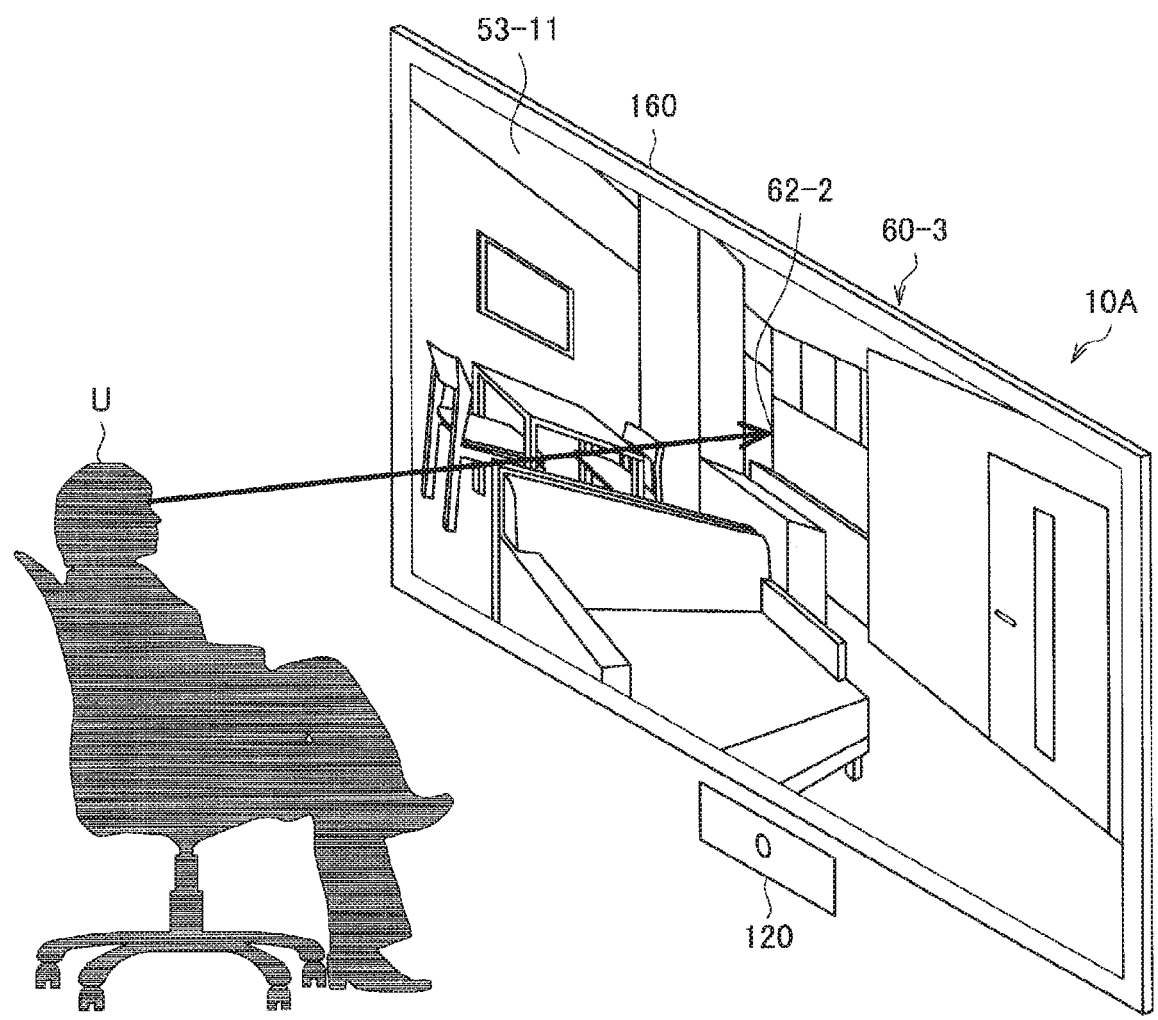
FIG. 11 is a diagram illustrating a third example of the information processing device 10A according to the embodiment.
Figure 12:
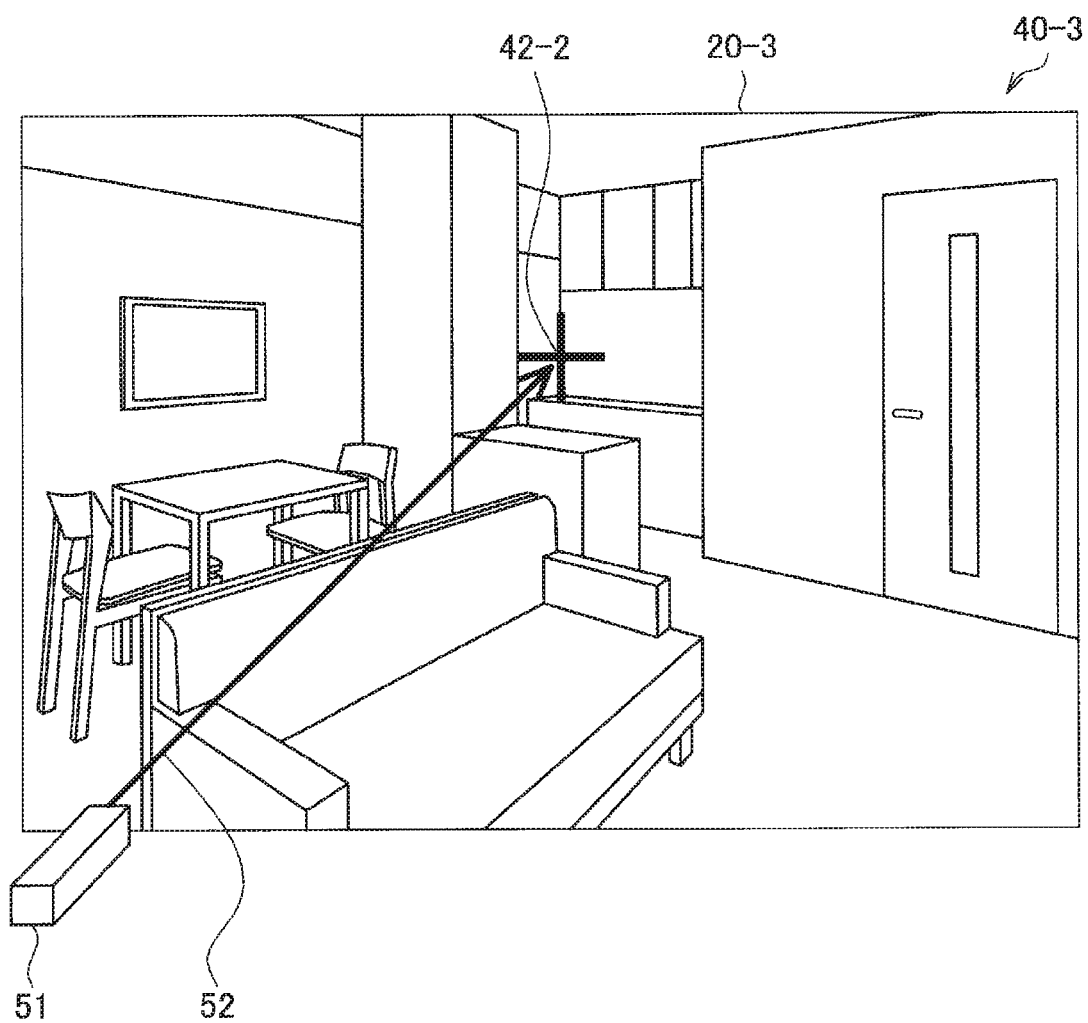
FIG. 12 is a diagram illustrating an example of a virtual object in a virtual space in the third example of the information processing device 10A according to the embodiment.

FIG. 11 is a diagram illustrating a third example of the information processing device 10A according to the first embodiment of the present disclosure. FIG. 12 is a diagram illustrating an example of a virtual object in a virtual space in the third example of the information processing device 10A according to the first embodiment of the present disclosure. As illustrated in FIG. 11, the information processing device 10A is installed in a room where a user U is present, and includes the attention information detection unit 120 and the output unit 160.

As illustrated in FIG. 11, also in the third example, a case in which the information processing device 10A is a television device is mainly assumed. Referring to FIG. 12, a virtual object 40-3 and a viewpoint camera 51 are virtually present in a virtual space 20-3. In addition, an image obtained by imaging the virtual object 40-3 by the viewpoint camera 51 is displayed by the output unit 160 under the control of the output control unit 111, so that a field of view 53-11 is provided to the user U. Referring to FIG. 11, a 3D model of a room is illustrated as an example of the virtual object 60-3 seen in the field of view 53-11. Also in the third example, non-zoon control and zoom control of the viewpoint camera 51 are performed as in the first example.

Figure 13:
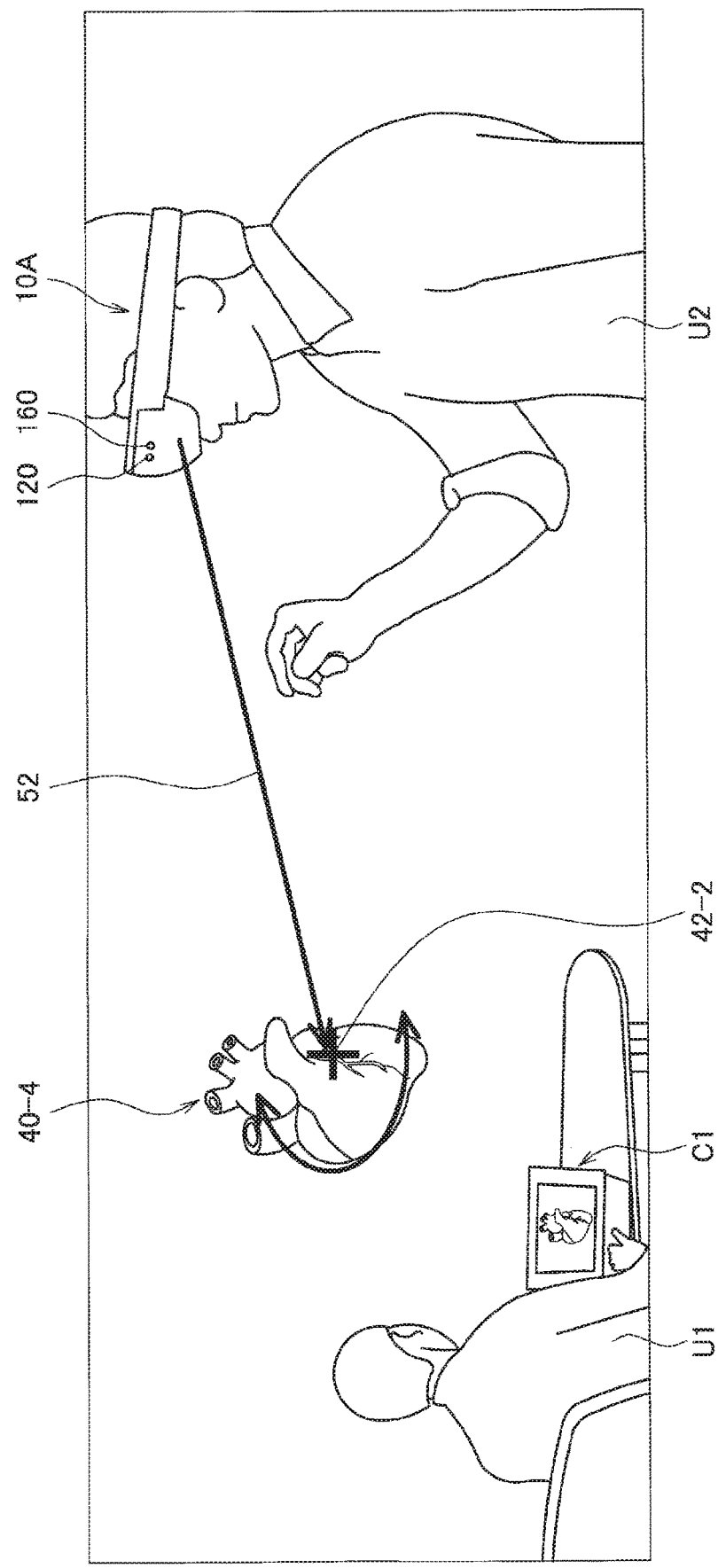
FIG. 13 is a diagram illustrating a fourth example of the information processing device 10A according to the embodiment.

FIG. 13 is a diagram illustrating a fourth example of the information processing device 10A according to the first embodiment of the present disclosure. As illustrated in FIG. 13, the information processing device 10A is worn on the head of a user U2, and includes the attention information detection unit 120 and the output unit 160. A user U1 different from the user U2 is watching a screen of a computer C1. The computer C1 manages 3D model information, displays a virtual object based on the 3D model information on the screen, and transmits the 3D model information to the information processing device 10A. Also in the fourth example, a case in which the information processing device 10A is an HMD for AR is mainly assumed as in the first example.

Referring to FIG. 13, a virtual object 40-4 and a viewpoint camera are virtually present in a virtual space. In addition, an image obtained by imaging the virtual object 40-4 by the viewpoint camera is displayed by the output unit 160 under the control of the output control unit 111, so that a field of view is provided to the user U. Referring to FIG. 13, a heart is illustrated as an example of the virtual object 40-4. Also in the fourth example, non-zoon control and zoom control of the viewpoint camera 51 are performed as in the first example.

2. Second Embodiment

The first embodiment of the present disclosure has been described above. Subsequently, a second embodiment of the present disclosure will be described. The second embodiment of the present disclosure describes an example in which an information processing device according to the second embodiment of the present disclosure includes a camera in a real space (hereinafter referred to as real camera in some cases).

However, in the second embodiment of the present disclosure, the camera that is subjected to non-zoom control and zoom control may be a real camera, or may be a virtual camera placed in a virtual space corresponding to a real space (hereinafter referred to as virtual camera in some cases). In the present embodiment, in the case where non-zoom control and zoom control of a virtual camera are performed, the information processing device according to the present embodiment generates a virtual object on the basis of an image acquired from a real camera, and images the virtual object by the virtual camera in a virtual space.

On the other hand, in the case where non-zoom control and zoom control of a real camera are performed in the present embodiment, the information processing device according to the present embodiment may control rotation, parallel movement, and driving of a zoom lens of the real camera.

Note that the functions of non-zoom control and zoom control already described in the first embodiment of the present disclosure may also be similarly applied to non-zoom control and zoom control of a virtual camera and non-zoom control and zoom control of a real camera in the first embodiment of the present disclosure. Hence, the second embodiment of the present disclosure mainly describes differences from the first embodiment.

2-1. Configuration

<Overall Configuration>

Figure 14:
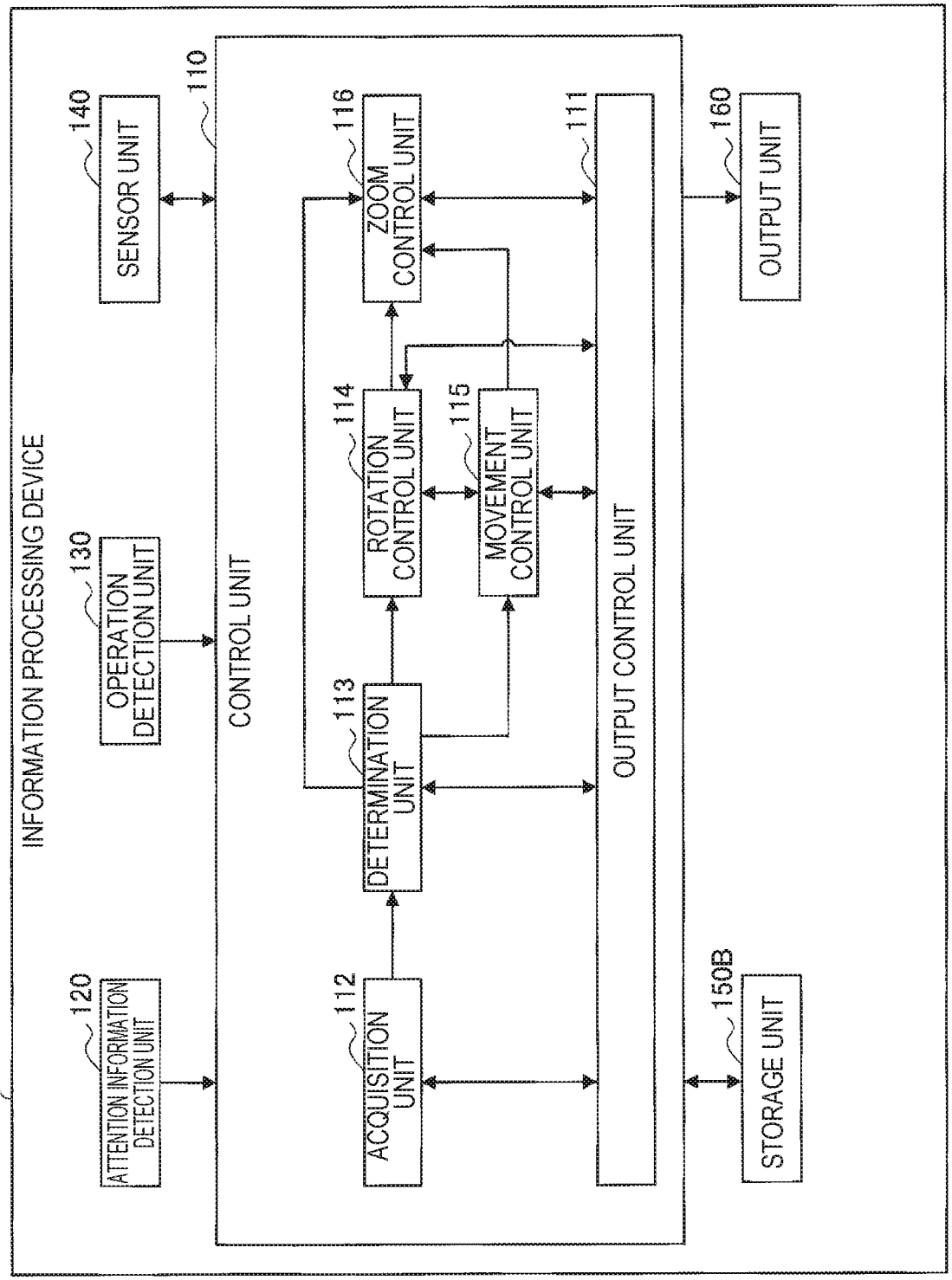
FIG. 14 is a diagram illustrating a functional configuration example of an information processing device according to a second embodiment of the present disclosure.

First, an overall configuration example of an information processing device according to the second embodiment of the present disclosure will be described. FIG. 14 is a diagram illustrating a functional configuration example of an information processing device according to the second embodiment of the present disclosure. As illustrated in FIG. 14, an information processing device 10B includes a sensor unit 140 including a real camera, and is different from the information processing device 10A according to the first embodiment of the present disclosure in that a storage unit 150B does not store 3D model information 151. Hereinafter, these differences will be mainly described.

Note that FIG. 14 illustrates an example in which a control unit 110, an attention information detection unit 120, an operation detection unit 130, the sensor unit 140, the storage unit 150B, and an output unit 160 are present inside the same device (information processing device 10B). However, positions where these blocks are present are not particularly limited. For example, as will be described later, some of these blocks may be present in another device.

The sensor unit 140 includes, for example, a real camera in a real space. Rotation, parallel movement, and driving of a zoom lens of the real camera included in the sensor unit 140 may be controlled by the control unit 110.

In addition, the sensor unit 140 may include a sensor that detects depth information regarding a real object in a real space. A method of detecting depth information regarding a real object is not particularly limited. For example, the sensor unit 140 may detect the depth information regarding the real object by a laser range finder, a depth sensor, or a stereo camera, or the depth information regarding the real object may be detected on the basis of a focal length of a camera lens, the size of an image captured by a camera, and the size of an image sensor. The information of the distance d described with reference to FIGS. 2 to 4, for example, is obtained from the depth information detected in the above-described manner.

(Functional Details)

Figure 15:
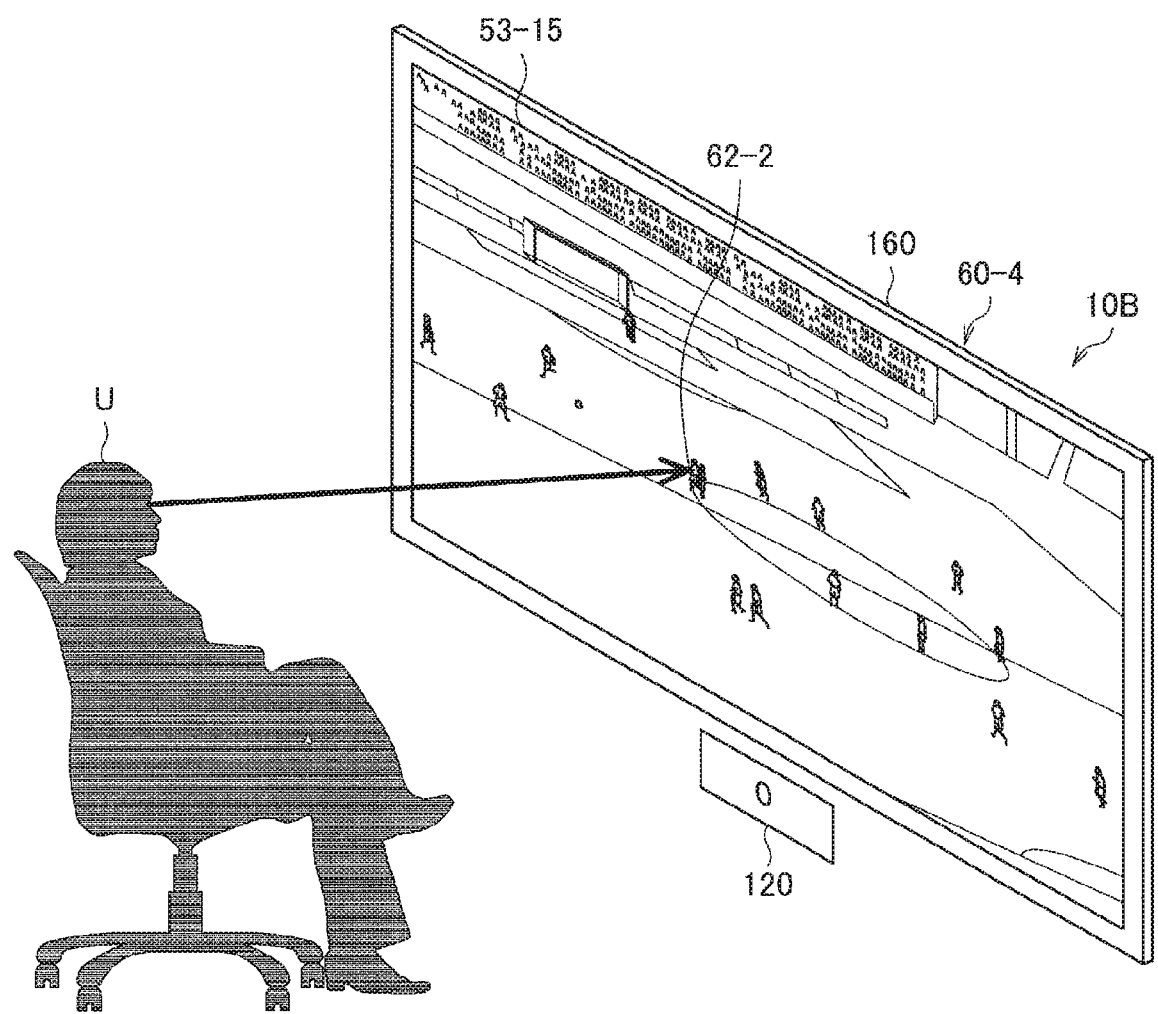
FIG. 15 is a diagram illustrating a first example of an information processing device 10B according to the embodiment.
Figure 16:
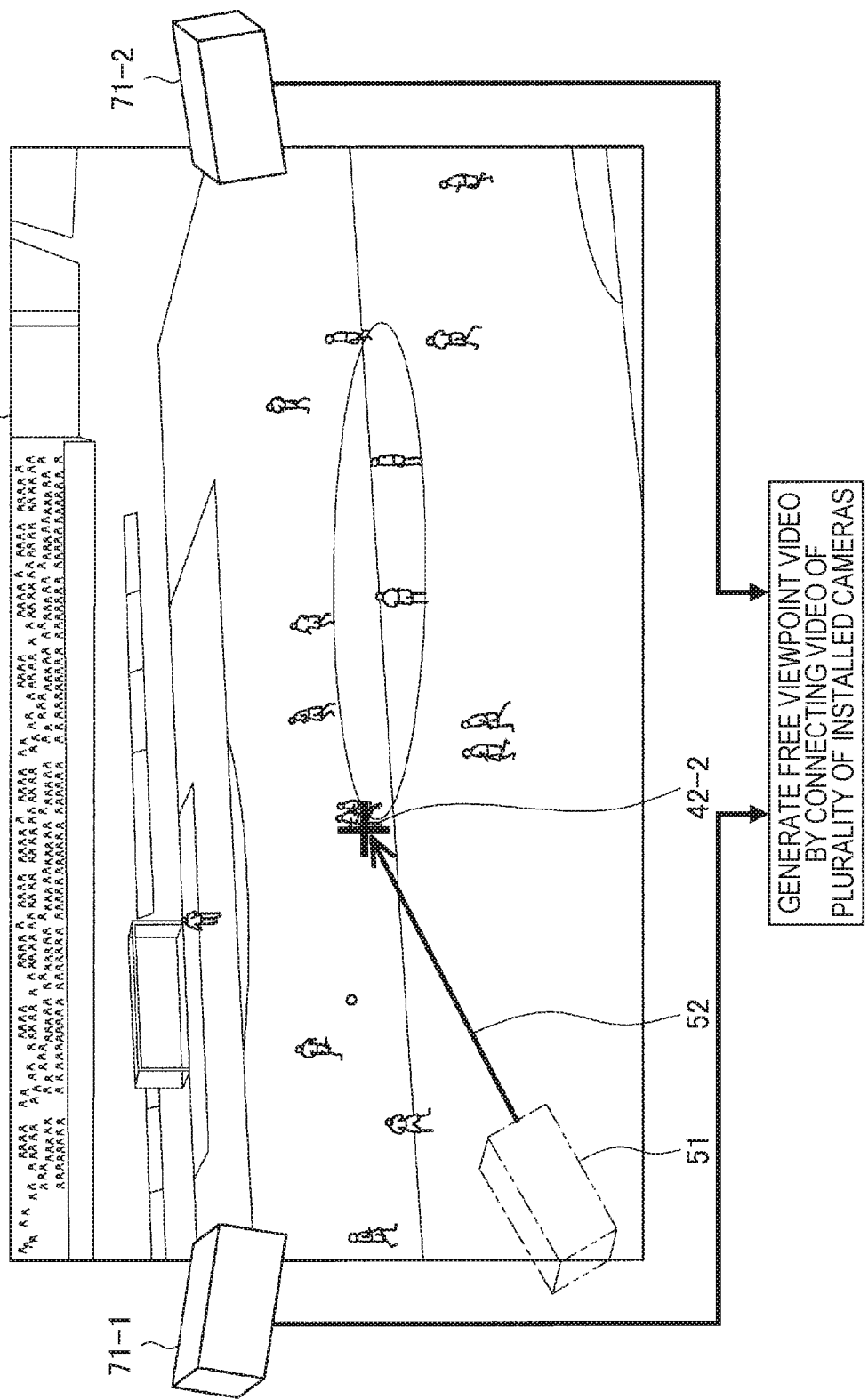
FIG. 16 is a diagram illustrating an example of a real object in a real space in the first example of the information processing device 10B according to the embodiment.

The overall configuration example of the information processing device 10B according to the second embodiment of the present disclosure has been described above. Subsequently, details of functions of the information processing device 10B according to the first embodiment of the present disclosure will be described. FIG. 15 is a diagram illustrating a first example of the information processing device 10B according to the second embodiment of the present disclosure. FIG. 16 is a diagram illustrating an example of a real object in a real space in the first example of the information processing device 10B according to the second embodiment of the present disclosure. As illustrated in FIG. 15, the information processing device 10B is installed in a room where a user U is present, and includes the attention information detection unit 120 and the output unit 160.

As illustrated in FIG. 15, in the first example, a case in which the information processing device 10B is a television device is mainly assumed. Referring to FIG. 16, a real object 40-4 is present in a real space 20-4, and a real camera 71-1 and a real camera 71-2 each of which images the real object 40-4 at different positions are present. The number of real cameras 71 is not particularly limited. In addition, the real camera 71 functions as a real camera included in the sensor unit 140 described with reference to FIG. 14.

In addition, a virtual viewpoint camera 51 (virtual camera) is installed in a virtual space corresponding to the real space in the real space 20-4. In addition, videos obtained by imaging the real object 40-4 by each of the real camera 71-1 and the real camera 71-2 are connected to each other by an output control unit 111, so that a free viewpoint video that is a virtual object captured by the virtual viewpoint camera 51 is generated.

The free viewpoint video generated by the output control unit 111 is displayed by the output unit 160, so that a field of view 53-15 is provided to the user U. Referring to FIG. 15, a soccer field (including players) is illustrated as an example of a virtual object 60-4 seen in the field of view 53-15. Note that the virtual object 60-4 is not limited to the soccer field. For example, the virtual object 60-4 may be a live hall where music is played, or may be a monitoring target region to be imaged by a monitoring camera.

In the second embodiment of the present disclosure, the attention information detection unit 120 detects a line of sight of the user U in a space where the user U is present, and detects a line of sight 52 of the user U in the real space 20-4 corresponding to the line of sight of the user U in the space as an example of attention information of the user U. In addition, the acquisition unit 112 acquires the line of sight 52 of the user U in the real space 20-4 and acquires the position of the real object 40-4 in the real space 20-4 from the sensor unit 140.

In this case, the determination unit 113 determines the attention target and a movement reference point on the basis of a surface corresponding to depth information regarding the real object 40-4 in the real space 20-4 and the line of sight of the user U in the real space 20-4. For example, the determination unit 113 may determine an intersection of the line of sight 52 of the user U in the virtual space 20-1 and the surface of the real object 40-4 as the attention target, or may determine a region in the vicinity of the intersection as the attention target (region of interest). In addition, in a first example, the determination unit 113 may determine a person (soccer player) being present at an intersection of the line of sight 52 of the user U in the real space 20-4 and the surface corresponding to the depth information of the real object 40-4, for example, as the attention target. In addition, FIG. 16 illustrates the line of sight 52 of the user U in the real space 20-4, and illustrates an example in which the determination unit 113 determines an intersection between the line of sight 52 of the user U in the real space 20-4 and the surface corresponding to the depth information regarding the real object 40-4 as a movement reference point 42-2. In the field of view 53-15, a movement reference point 62-2 is seen as a point corresponding to the movement reference point 42-2 in the real space 20-4.

The rotation control unit 114 and the movement control unit 115 perform non-zoom control of the viewpoint camera 51 on the basis of attention information. In this specification, the rotation control unit 114 and the movement control unit 115 perform non-zoom control in a manner that the movement reference point 42-2 moves to the center of the field of view. The rotation control unit 114 performs control to rotate the viewpoint camera 51, and the movement control unit 115 performs control to move the viewpoint camera 51 in parallel in a direction perpendicular to an optical axis of the viewpoint camera 51.

For example, the control to rotate the viewpoint camera 51 by the rotation control unit 114 may be control based on the camera rotation speed $\omega_C$ described with reference to FIGS. 2 to 4. In addition, the control to move the viewpoint camera 51 in parallel by the movement control unit 115 may be control based on the camera parallel movement speed $v_h$ described with reference to FIGS. 2 to 4.

Furthermore, also in the second embodiment of the present disclosure, the zoom control unit 116 performs zoom control of the camera on the basis of non-zoom control and attention information when non-zoom control by the rotation control unit 114 and the movement control unit 115 is performed.

For example, the zoom control unit 116 may control zoom speed as described with reference to FIGS. 2 to 4. Zoom control may be performed by controlling zoom speed of the camera on the basis of parameters related to non-zoom control.

The zoom control unit 116 may control zoom speed in a manner that the angle-of-view change speed $\omega_Z$ or the parallel movement speed $v_Z$ in the optical axis direction of the camera, which is related to zoom speed, satisfies at least one of the above expressions (4) to (7), (9), (10), (12), or (14) indicating conditions.

Also in the second embodiment of the present disclosure, such a configuration makes it less likely for the user U to lose sight of the attention target, and a decrease in visibility of the attention target can be suppressed.

Note that also in the second embodiment of the present disclosure, zoom control by the zoom control unit 116 may be performed substantially simultaneously with non-zoom control by the rotation control unit 114 and the movement control unit 115.

2-2. Application Examples

The example (first example) of the information processing device 10A according to the second embodiment of the present disclosure has been described above; however, the information processing device 10A according to the second embodiment of the present disclosure can also be applied to examples other than the above. Described below with reference to FIGS. 17 to 28 as application examples are some other examples of the information processing device 10A according to the second embodiment of the present disclosure.

Figure 17:
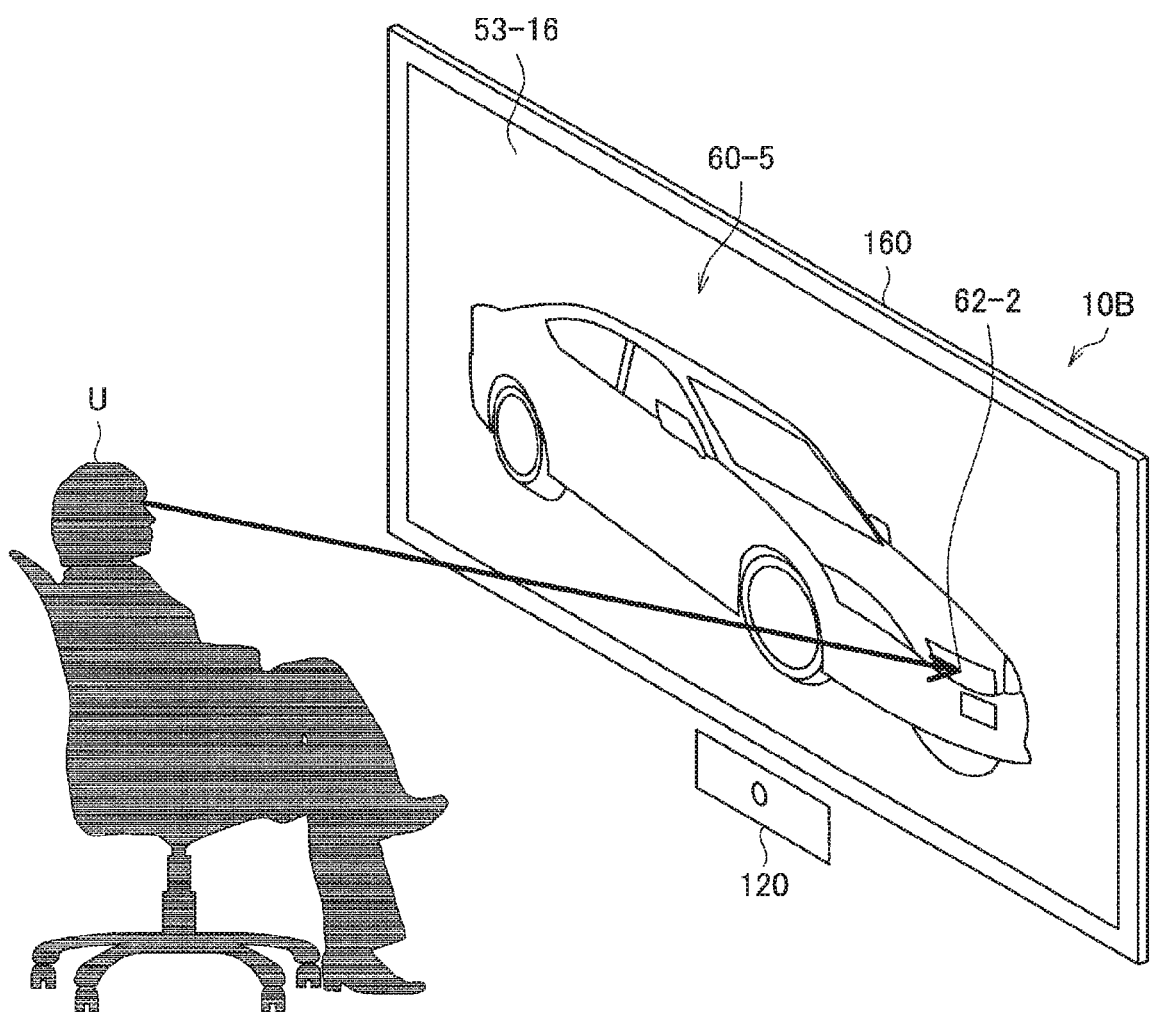
FIG. 17 is a diagram illustrating a second example of the information processing device 10B according to the embodiment.
Figure 18:
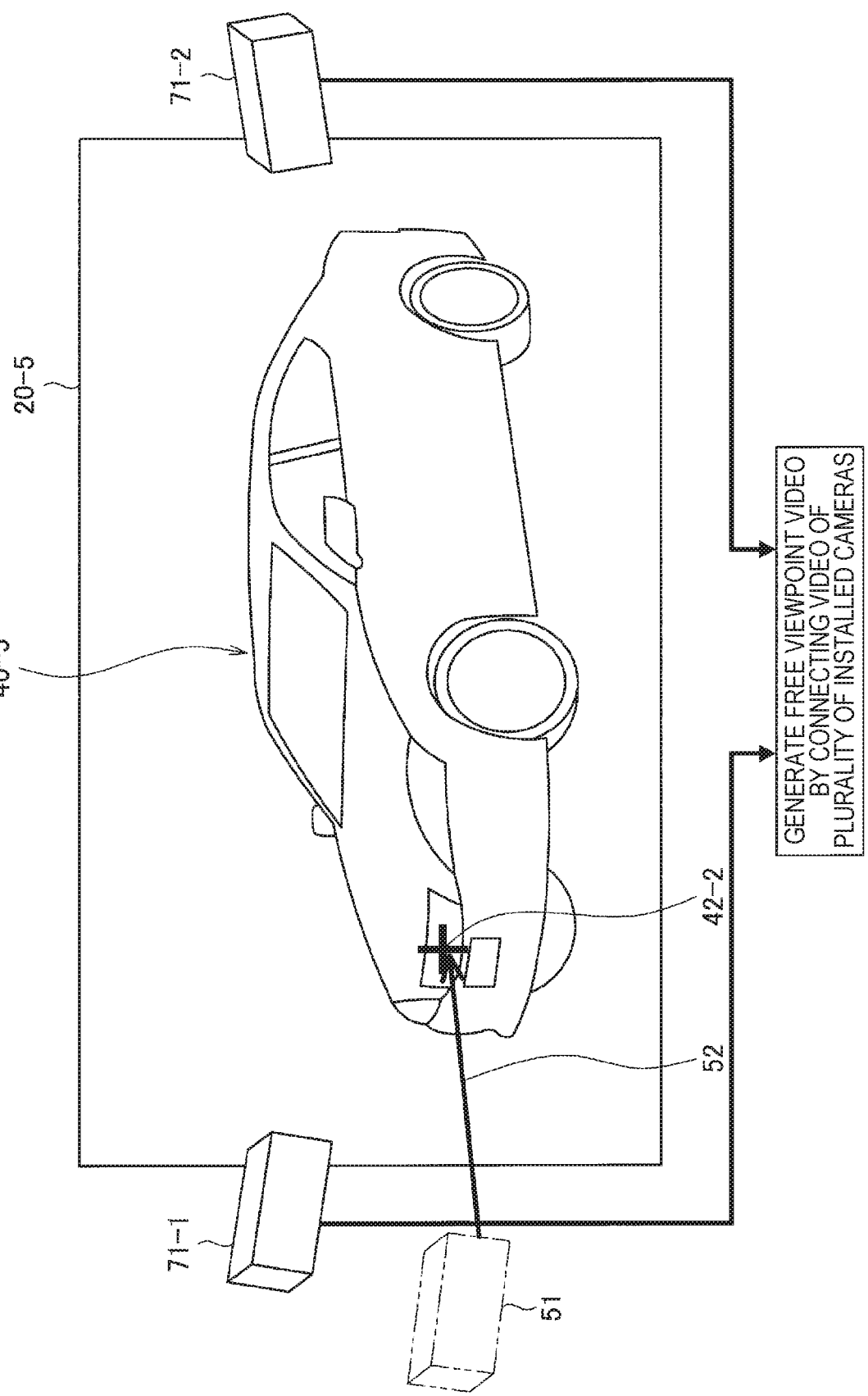
FIG. 18 is a diagram illustrating an example of a real object in a real space in the second example of the information processing device 10B according to the embodiment.

FIG. 17 is a diagram illustrating a second example of the information processing device 10B according to the second embodiment of the present disclosure. FIG. 18 is a diagram illustrating an example of a real object in a real space in the second example of the information processing device 10B according to the second embodiment of the present disclosure. As illustrated in FIG. 17, the information processing device 10B is installed in a room where a user U is present, and includes the attention information detection unit 120 and the output unit 160.

As illustrated in FIG. 17, also in the second example, a case in which the information processing device 10B is a television device is mainly assumed. Referring to FIG. 18, a real object 40-5 is present in a real space 20-5, and a real camera 71-1 and a real camera 71-2 each of which images the real object 40-5 at different positions are present. The number of real cameras 71 is not particularly limited. In addition, a virtual viewpoint camera 51 is installed in a virtual space corresponding to the real space in the real space 20-5. In addition, videos obtained by imaging the real object 40-5 by each of the real camera 71-1 and the real camera 71-2 are connected to each other by the output control unit 111, so that a free viewpoint video that is a virtual object captured by the virtual viewpoint camera 51 is generated.

The free viewpoint video generated by the output control unit 111 is displayed by the output unit 160, so that a field of view 53-16 is provided to the user U. Referring to FIG. 17, a vehicle is illustrated as an example of a real object 60-5 seen in the field of view 53-16. Note that the real object 60-5 is not limited to the vehicle. Also in the present example, non-zoon control and zoom control of the viewpoint camera 51 are performed as in the first example of the second embodiment of the present disclosure.

Figure 19:
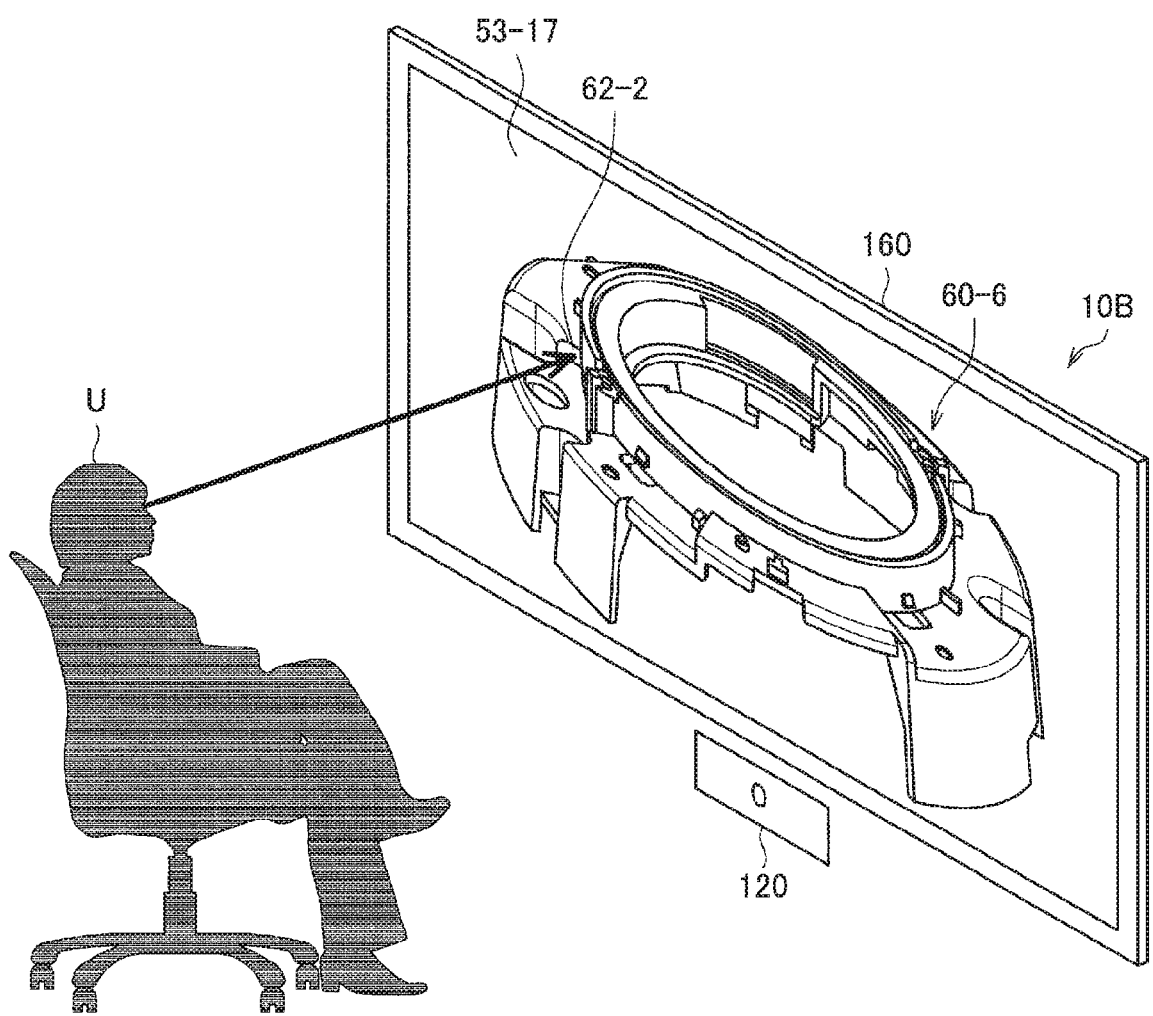
FIG. 19 is a diagram illustrating a third example of the information processing device 10B according to the embodiment.
Figure 20:
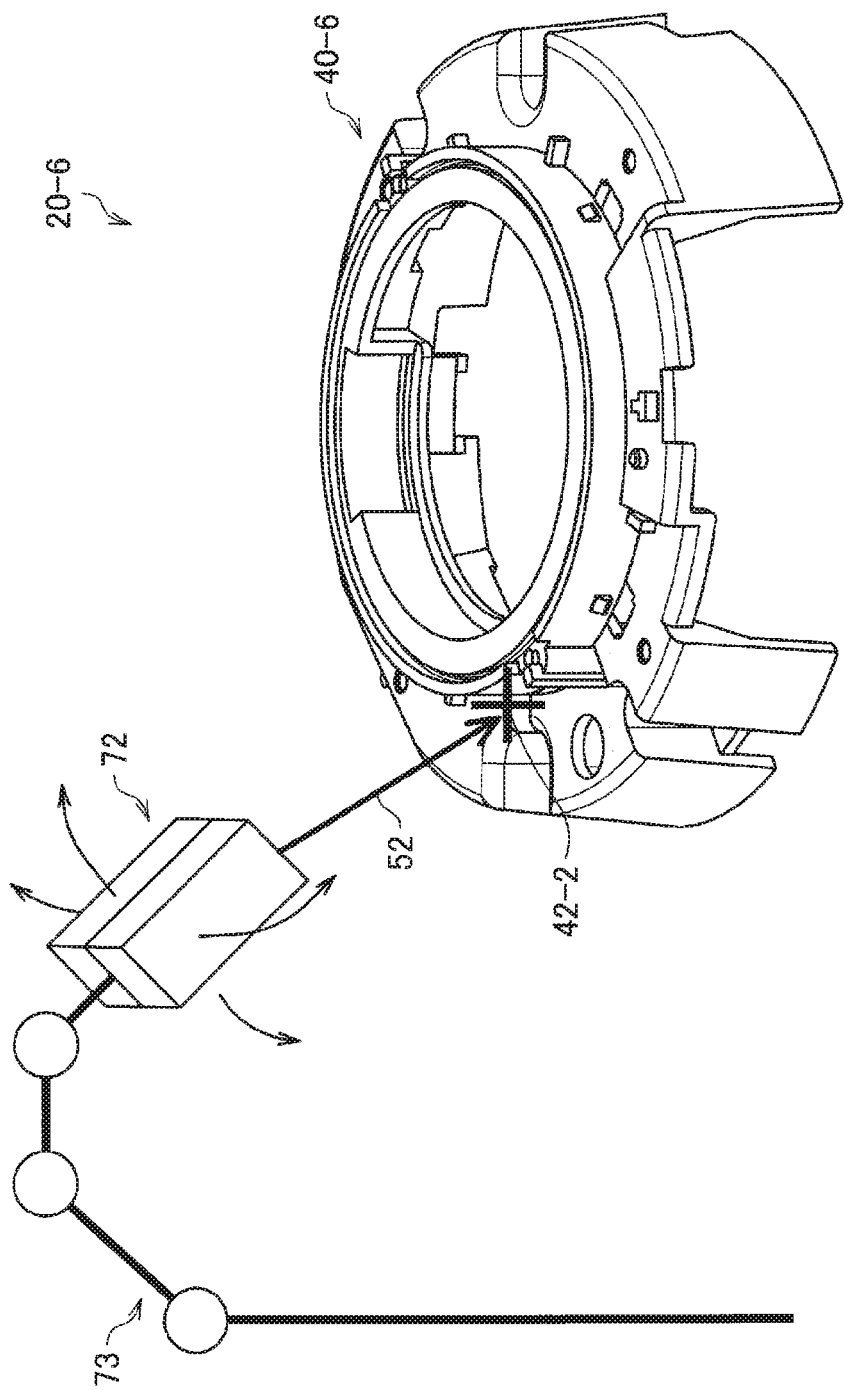
FIG. 20 is a diagram illustrating an example of a real object in a real space in the third example of the information processing device 10B according to the embodiment.

FIG. 19 is a diagram illustrating a third example of the information processing device 10B according to the second embodiment of the present disclosure. FIG. 20 is a diagram illustrating an example of a real object in a real space in the third example of the information processing device 10B according to the second embodiment of the present disclosure. As illustrated in FIG. 19, the information processing device 10B is installed in a room where the user U is present, and includes the attention information detection unit 120 and the output unit 160.

As illustrated in FIG. 19, also in the third example, a case in which the information processing device 10B is a television device is mainly assumed. Referring to FIG. 20, a real object 40-6 is present in a real space 20-6, and a stereo camera 72 (an example of a real camera) is present in the real space. In addition, a video obtained by imaging the real object 40-6 by the stereo camera 72 is displayed by the output unit 160, so that a field of view 53-17 is provided to the user U. Referring to FIG. 19, a machine is illustrated as an example of a real object 60-6 seen in the field of view 53-17. Note that the real object 60-6 is not limited to the machine.

In the present example, the attention information detection unit 120 detects a line of sight of the user U in a space where the user U is present, and detects a line of sight 52 of the user U in the real space 20-6 corresponding to the line of sight of the user U in the space as an example of attention information of the user U. In addition, the acquisition unit 112 acquires the line of sight 52 of the user U in the real space 20-6, and acquires the position of the real object 40-6 in the real space 20-6 from the stereo camera 72.

In the present example, the control unit 110 controls parallel movement and rotation by a robot arm 73 or driving of a zoom lens included in the stereo camera 72; thus, non-zoom control and zoom control are performed. Note that the stereo camera 72 is not necessarily moved or rotated by the robot arm 73. For example, the stereo camera 72 may be moved or rotated by a movable robot instead of the robot arm 73. In addition, the zoom control unit 116 may change a focal length by controlling driving of the zoom lens of the stereo camera 72.

Figure 21:
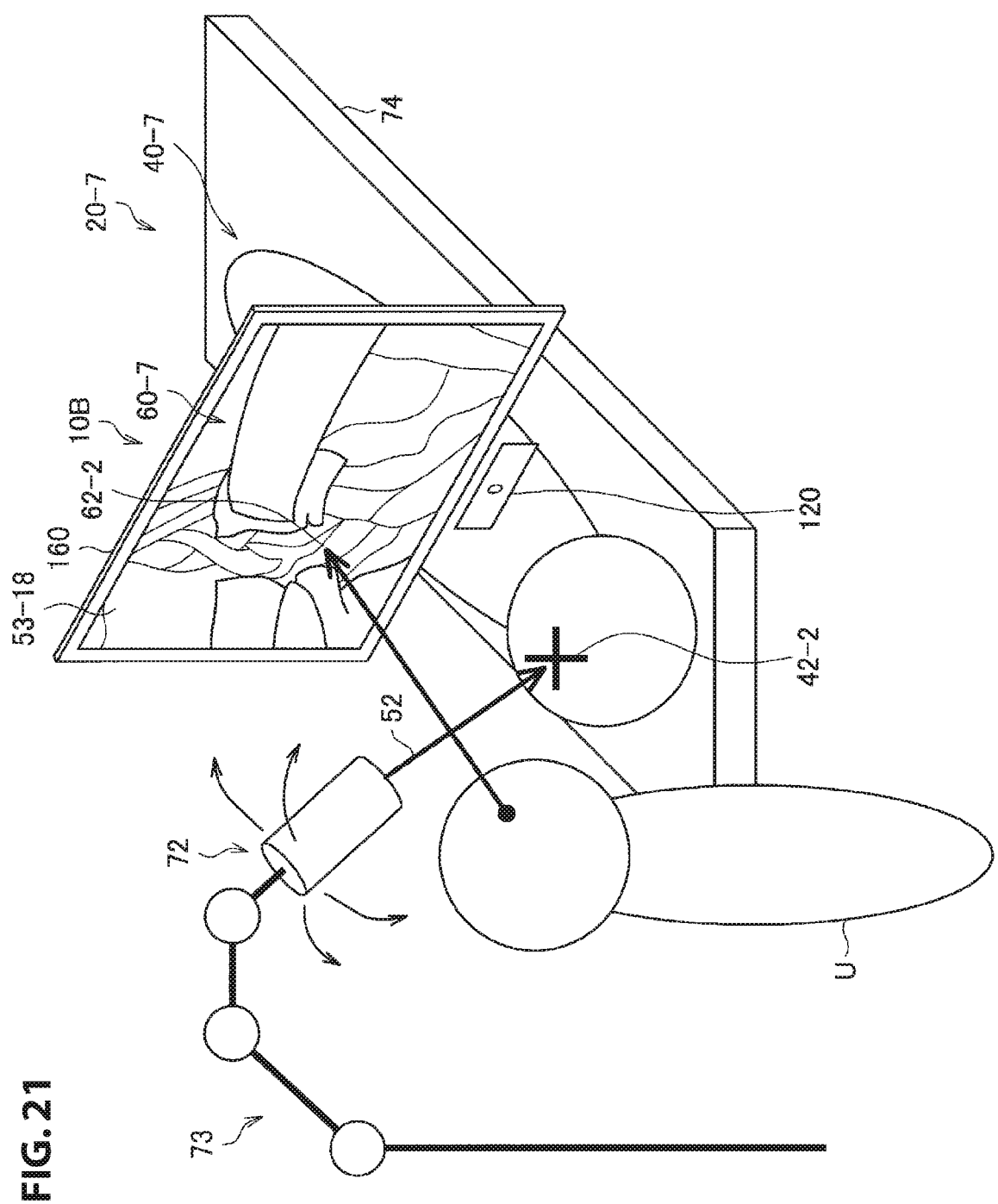
FIG. 21 is a diagram illustrating a fourth example of the information processing device 10B according to the embodiment.

FIG. 21 is a diagram illustrating a fourth example of the information processing device 10B according to the second embodiment of the present disclosure. As illustrated in FIG. 21, the information processing device 10B is installed in an operating room where the user U is present, and includes the attention information detection unit 120 and the output unit 160. In addition, an operating table 74 is present in the operating room.

As illustrated in FIG. 21, also in the fourth example, a case in which the information processing device 10B is a monitor is mainly assumed. Referring to FIG. 21, a real object 40-7 and the stereo camera 72 are present in a real space 20-7. In addition, a video obtained by imaging the real object 40-7 by the stereo camera 72 is displayed by the output unit 160, so that a field of view 53-18 is provided to the user U. Referring to FIG. 21, a person to be operated is illustrated as an example of a real object 60-7 seen in the field of view 53-18.

In the present example, the attention information detection unit 120 detects a line of sight of the user U, and detects a line of sight 52 of the user U in the real space 20-7 corresponding to the line of sight of the user U as an example of attention information of the user U. In addition, the acquisition unit 112 acquires the line of sight 52 of the user U in the real space 20-7 and acquires the position of the real object 40-7 in the real space 20-7 from the stereo camera 72.

In the present example, the control unit 110 controls parallel movement and rotation by a robot arm 73 or driving of a zoom lens included in the stereo camera 72; thus, non-zoom control and zoom control are performed. Note that the stereo camera 72 is not necessarily moved or rotated by the robot arm 73. For example, the stereo camera 72 may be moved or rotated by a movable robot instead of the robot arm 73. In addition, the stereo camera 72 may include a zoom lens driving mechanism, and the zoom control unit 116 may change a focal length by controlling driving of the zoom lens of the stereo camera 72.

In addition, in the present example, zoom control of the camera may be performed on the basis of a user operation detected by a foot switch that is not illustrated (an example of the operation detection unit 130). For example, a zoom amount may be a value corresponding to an amount of depression of the foot switch. In addition, zoom speed may be changed in accordance with the zoom amount, or may be constant. In addition, in such a case, the output control unit 111 may cause a guide related to a zoom operation on the camera by the user to be displayed.

Figure 22:
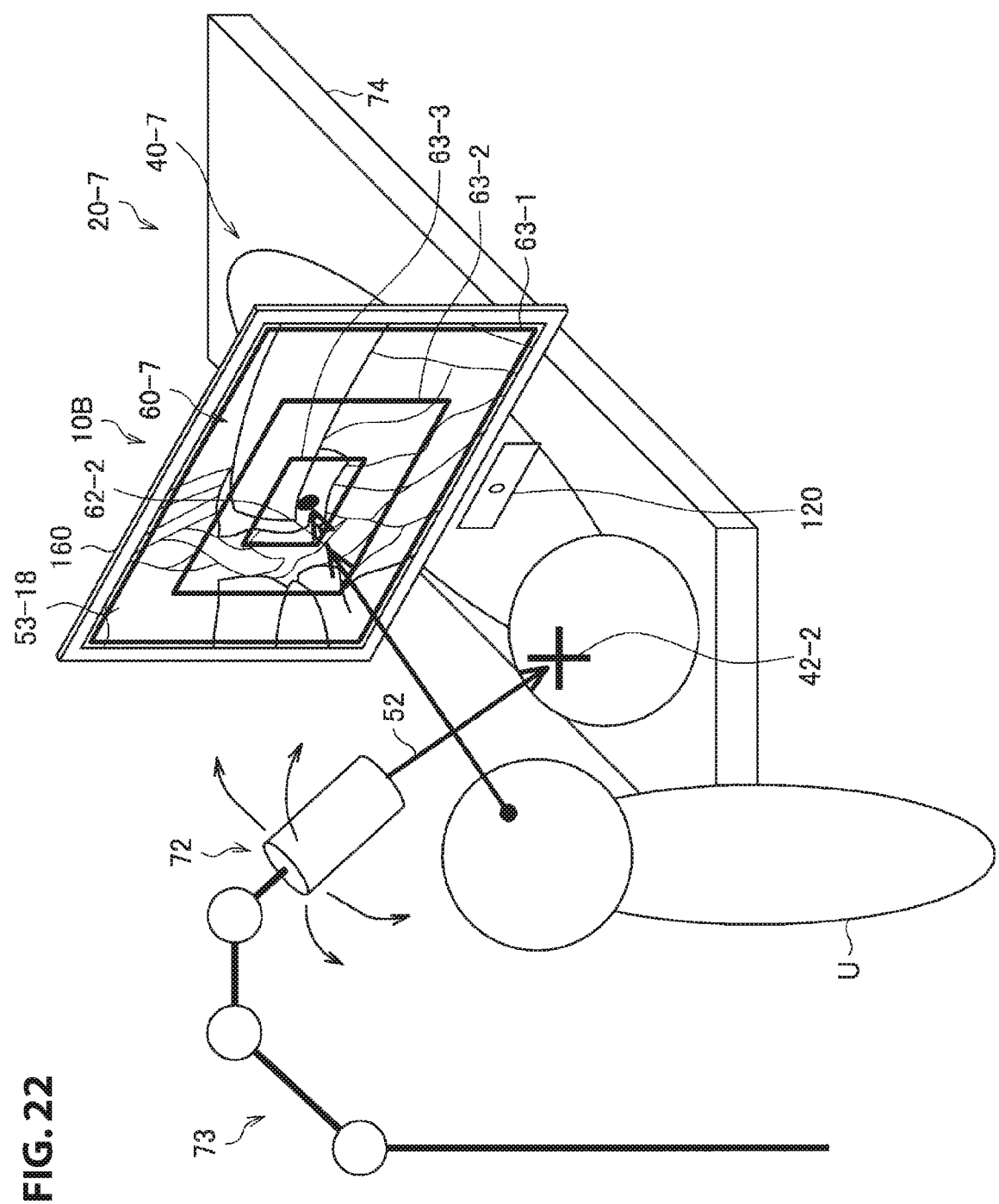
FIG. 22 is an explanatory diagram for describing an example of a guide caused to be displayed by an output control unit 111 according to the embodiment.

FIG. 22 is an explanatory diagram for describing an example of a guide caused to be displayed by the output control unit 111. For example, when an amount of depression of the foot switch reaches a first threshold, the stereo camera 72 enters a standby state for zooming. When the amount of depression becomes equal to or greater than a second threshold, the stereo camera 72 starts zooming, that is, changes zoom magnification. In the present example, the first threshold is set to be smaller than the second threshold. Note that the stereo camera 72 may be put into a standby state in accordance with touch of a foot on the foot switch, instead of stepwise control corresponding to the amount of depression. For detecting the touch of the foot on the foot switch, any sensor such as a pressure sensor, a capacitive sensor, a depth sensor, or an image sensor may be used.

In addition, for example, non-zoom control is started by a control start operation using sound or the like. Note that the output control unit 111 preferably causes a pointer indicating a line-of-sight position 62-2 to be displayed.

In the standby state, a guide frame 63-1 corresponding to a zoom range (a display range after completion of zoom control) is displayed. The guide frame becomes smaller as the amount of depression of the foot switch increases. Alternatively, the guide frame may be made smaller stepwise with respect to the amount of depression. For example, the guide frame 63-1, a guide frame 63-2 (e.g., amount of depression: 20%), and a guide frame 63-3 (e.g., amount of depression: 40%) may be displayed in accordance with the amount of depression.

Normally, completion of zooming is later than completion of a zoom operation by depression. In contrast, display of a guide frame in response to a zoom operation is performed without delay. Since the guide frame is displayed without delay, the user U can recognize that zoom control corresponding to the user U's zoom operation will cause the gaze target to fall outside the display range during zoom control. Consequently, such a configuration enables the user to perform adjustment such as suspending the zoom operation (making the amount of depression smaller) so as not to lose sight of the attention target.

Figure 23:
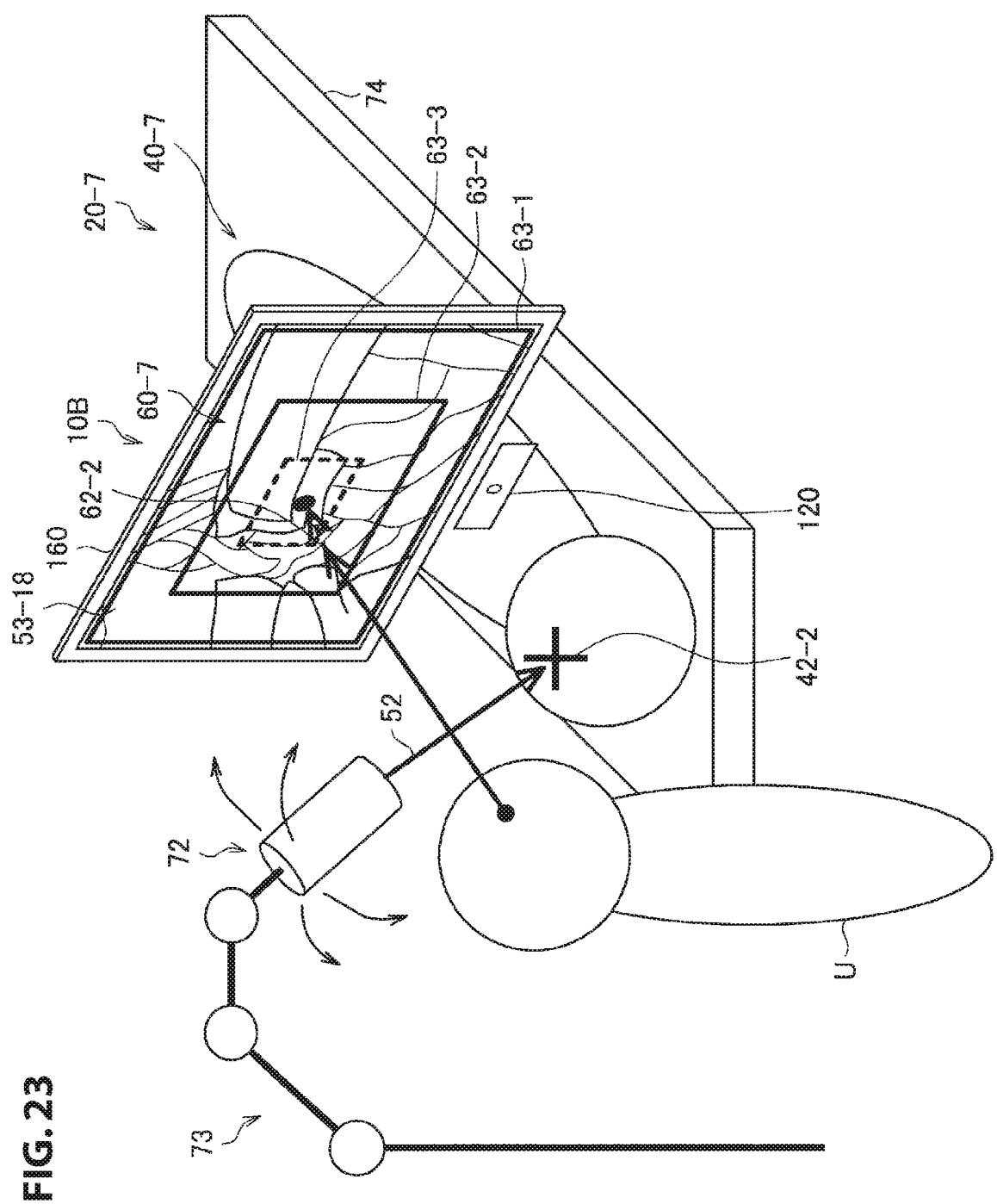
FIG. 23 is an explanatory diagram for describing another example of a guide caused to be displayed by the output control unit 111 according to the embodiment.

FIG. 23 is an explanatory diagram for describing another example of a guide caused to be displayed by the output control unit 111. Also in the present example, after audio instruction, non-zoom control of the stereo camera 72 is performed. In addition, the zoom control unit 116 can determine whether or not the point of interest (an example of the attention target) 62-2 is present in a display range (field of view) after zooming, on the basis of parameters related to current non-zoom control and zoom speed specified from a foot pedal operation by the user U.

In the case where it is determined that the current foot pedal operation (amount of depression) will cause the point of interest 62-2 to fall outside the display range (field of view) after zooming, the output control unit 111 may change display of the guide frame, to notify (make the user U aware) that there is a concern that the point of interest 62-2 moves outside the field of view. Notification by the output control unit 111 may be made by varying a color and a line type (double line, broken line, dotted line, etc.) of the guide frame, for example. In the example of FIG. 23, the guide frame 63-3 is displayed with a line type (broken line) different from the guide frame 63-1 and the guide frame 63-2; thus, the user U can grasp that the current foot pedal operation will cause the attention target to fall outside the display range during zoom control. Therefore, the user U can adjust an amount of depression during camera movement more accurately in a manner that, for example, the frame does not become red.

As in the above-described example, zoom speed may be controlled (limited) so that the attention target is present in the display range on the basis of attention information and non-zoom control. In such a case, the zoom speed is different from normal zoom speed based on a foot pedal operation, and a change in image exhibits a mode different from a normal mode. Therefore, there is a concern that the user U feels unnaturalness about the change in image in response to the operation. Consequently, in the case where the zoom control unit 116 limits zoom speed (makes zoom speed slower than normal zoom speed), the output control unit 111 may notify the user that zoom speed is limited. Such notification may be made by various methods such as sound or display. As a mode other than sound or display, for example, an example such as applying more resistance (load) to the foot switch operation than usual can be given.

Note that the user U may perform a limitation cancel (release) operation in response to notification indicating that zoom speed is limited, and the limitation cancel operation may be, for example, a line-of-sight operation, a gesture operation, an audio operation, a touch operation, or the like. In the case where it is detected that the user U has performed a limitation cancel operation, the zoom control unit 116 may release the limitation on zoom speed. With such a configuration, in the case where the user U performs a cancel operation, the user U can determine that the attention target may fall outside the display region, and a feeling of unnaturalness about zoom speed can be controlled freely. In addition, the output of the guide described above can also be applied to other examples.

Figure 24:
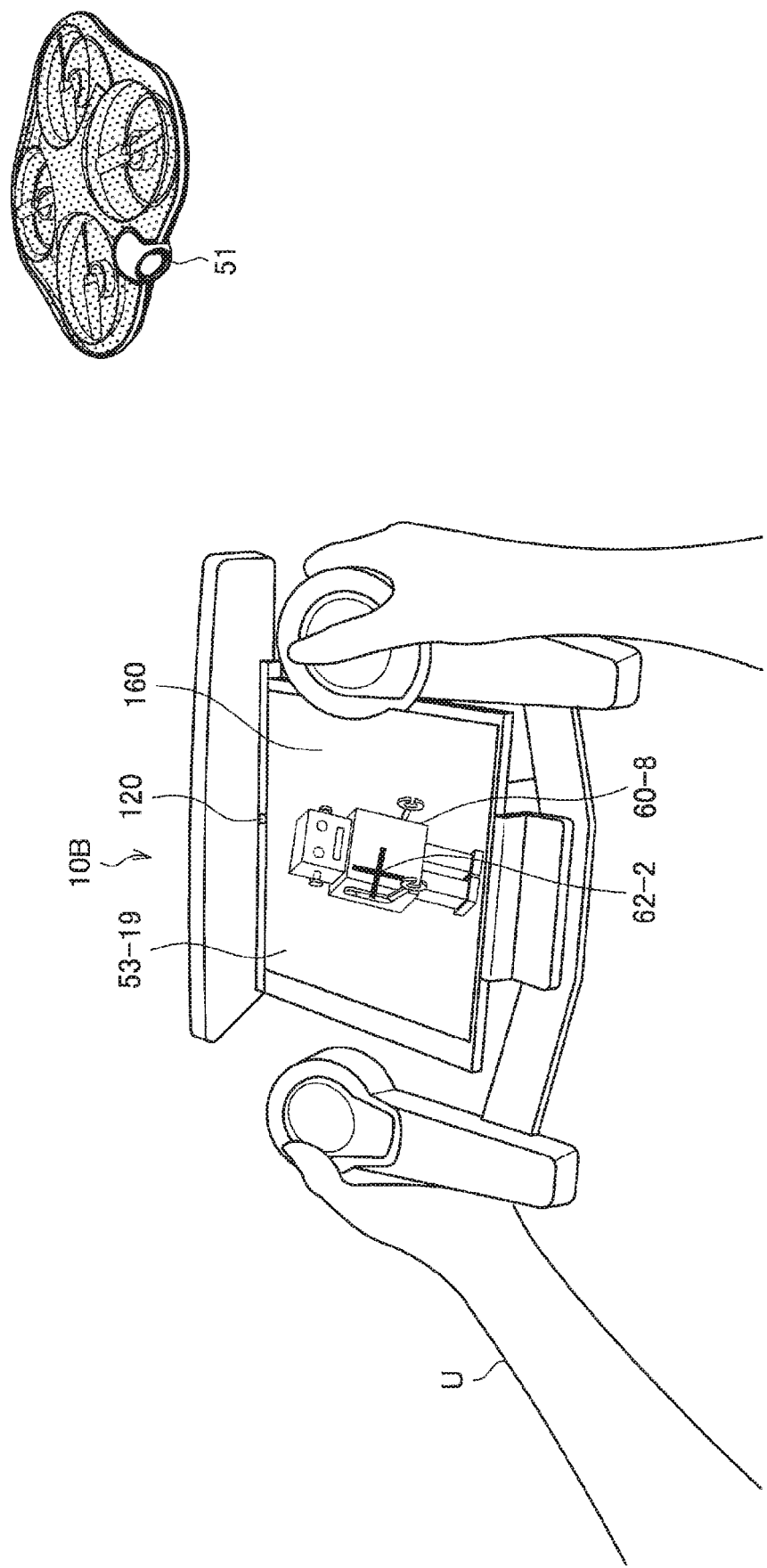
FIG. 24 is a diagram illustrating a fifth example of the information processing device 10B according to the embodiment.
Figure 25:
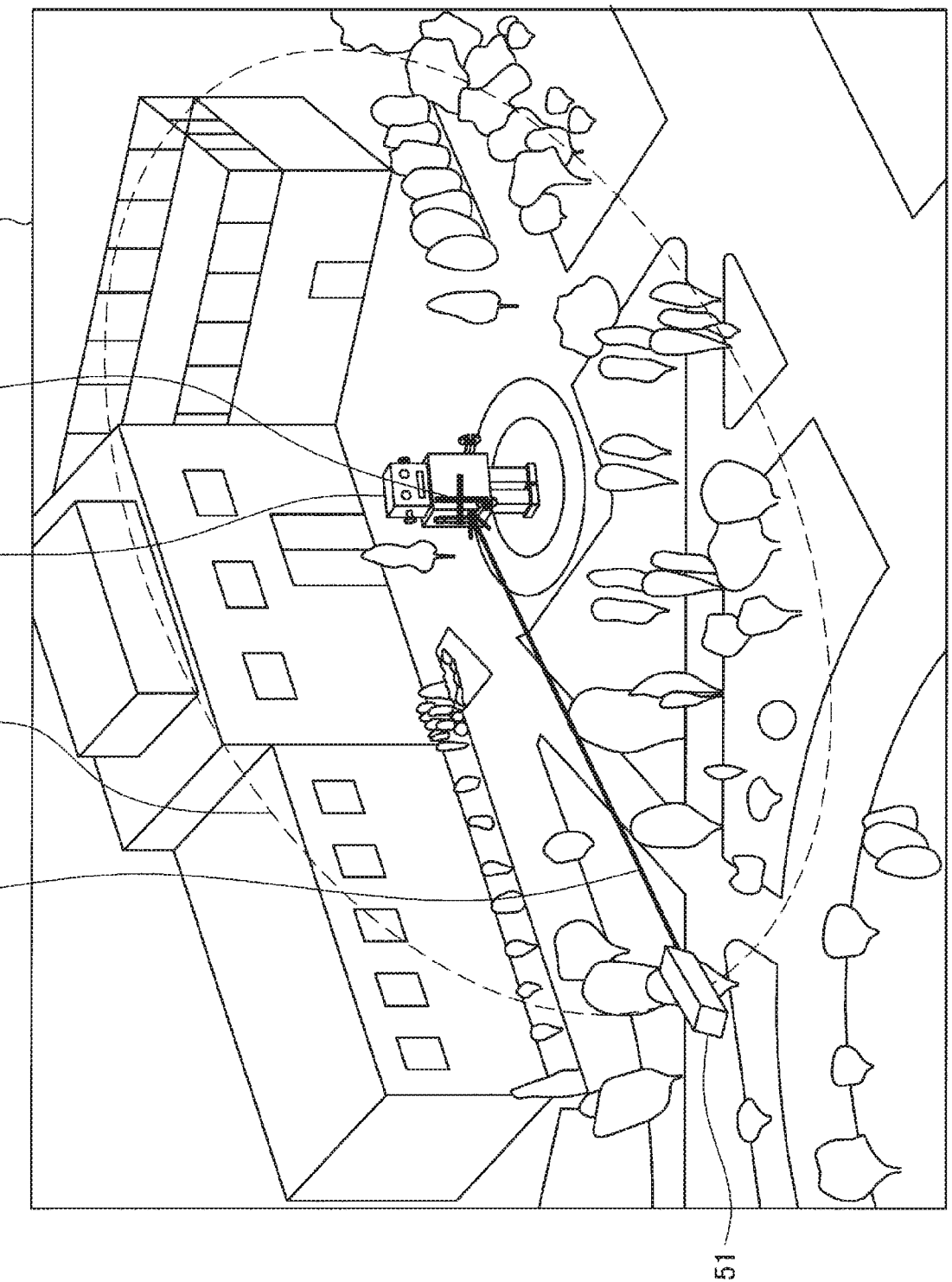
FIG. 25 is a diagram illustrating an example of a real object in a real space in the fifth example of the information processing device 10B according to the embodiment.

FIG. 24 is a diagram illustrating a fifth example of the information processing device 10B according to the second embodiment of the present disclosure. FIG. 25 is a diagram illustrating an example of a real object in a real space in the fifth example of the information processing device 10B according to the second embodiment of the present disclosure. As illustrated in FIG. 24, the information processing device 10B is a controller to which a user U can input a rotating operation, a moving operation, and the like and includes the attention information detection unit 120 and the output unit 160.

Referring to FIG. 25, a real object 40-8, and a viewpoint camera 51 that is a real camera are present in a real space 20-8. In the example illustrated in FIGS. 24 and 25, the viewpoint camera 51 that is a real camera is mounted on a drone. In addition, a video obtained by imaging the real object 40-8 by the viewpoint camera 51 is displayed by the output unit 160, so that a field of view 53-19 is provided to the user U. Referring to FIG. 24, a robot is illustrated as an example of a real object 60-8 seen in the field of view 53-19. Note that the real object 60-8 is not limited to the robot.

In the present example, the attention information detection unit 120 detects a line of sight of the user U in the real space where the user U is present, and detects a line of sight 52 of the user U in the real space 20-8 corresponding to the line of sight of the user U in the space as an example of attention information of the user U. In addition, the acquisition unit 112 acquires the line of sight 52 of the user U in the real space 20-8 and acquires the position of the real object 40-8 in the real space 20-8 from the viewpoint camera 51 (for example, a depth camera).

In the present example, parallel movement and rotation of a drone having the viewpoint camera 51 mounted thereon and driving of a zoom lens included in the viewpoint camera 51 are controlled by the control unit 110; thus, non-zoom control and zoom control are performed. FIG. 25 illustrates a track 55 of the drone having the viewpoint camera 51 mounted thereon. Note that, in FIG. 24, a case in which the information processing device 10B is a controller operated by the user U has been described. However, the information processing device 10B is not limited to the controller operated by the user U, and may be a wearable device. In addition, the wearable device may include the attention information detection unit 120 and the output unit 160.

Figure 26:
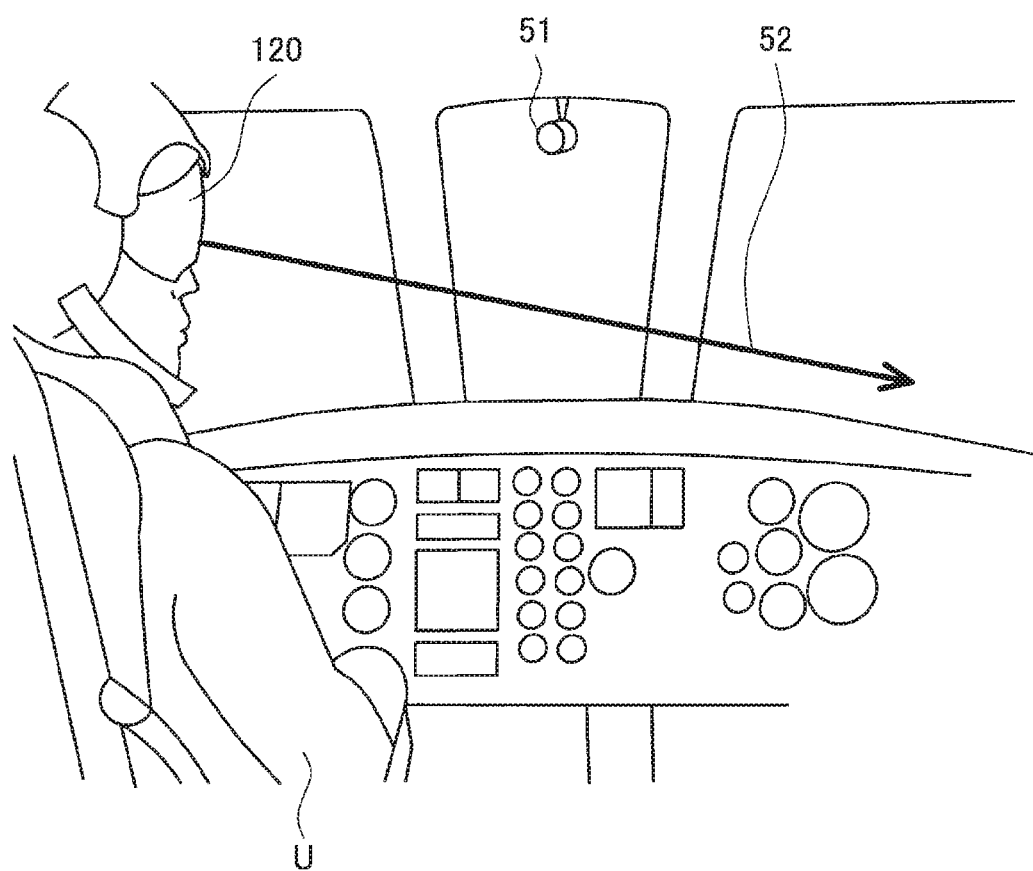
FIG. 26 is a diagram illustrating a sixth example of the information processing device 10B according to the embodiment.
Figure 27:
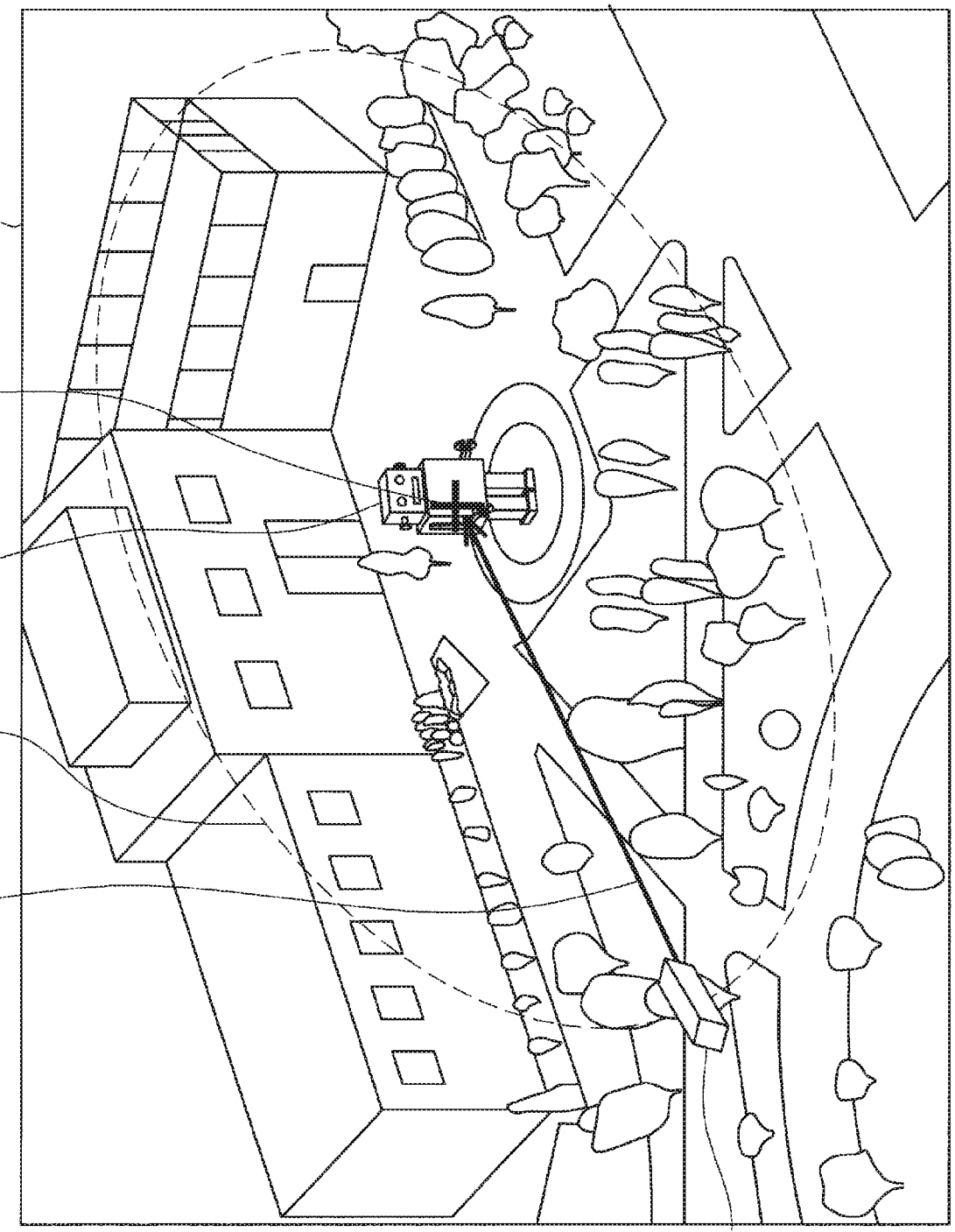
FIG. 27 is a diagram illustrating an example of a real object in a real space in the sixth example of the information processing device 10B according to the embodiment.

FIG. 26 is a diagram illustrating a sixth example of the information processing device 10B according to the second embodiment of the present disclosure. FIG. 27 is a diagram illustrating an example of a real object in a real space in the sixth example of the information processing device 10B according to the second embodiment of the present disclosure. As illustrated in FIG. 24, the information processing device 10B is worn on the head of the user U on a helicopter, and includes the attention information detection unit 120. Note that the information processing device 10B does not particularly need to include the output unit 160.

Referring to FIG. 27, a real object 40-9 and a viewpoint camera 51 that is a real camera are present in a real space 20-9. In the example illustrated in FIGS. 26 and 27, the viewpoint camera 51 is mounted on a helicopter. In the present example, a field of view of the viewpoint camera 51 is formed by a landscape that the viewpoint camera 51 looks down and images from the helicopter. Referring to FIG. 27, a robot is illustrated as an example of the real object 40-9 seen in the field of view. Note that the real object 40-9 is not limited to the robot.

In the present example, the attention information detection unit 120 detects a line of sight 52 of the user U in the real space 20-9 as an example of attention information of the user U, on the basis of the line of sight of the user U and the direction of the attention information detection unit 120. In addition, the acquisition unit 112 acquires the line of sight 52 of the user U in the real space 20-9 and acquires the position of the real object 40-9 in the real space 20-9 from the viewpoint camera 51 (for example, a depth camera).

In the present example, parallel movement and rotation of a helicopter having the viewpoint camera 51 mounted thereon and driving of a zoom lens included in the viewpoint camera 51 are controlled by the control unit 110; thus, non-zoom control and zoom control are performed. FIG. 27 illustrates a track 55 of the helicopter having the viewpoint camera 51 mounted thereon. Note that, in FIG. 26, a case in which the information processing device 10B is worn on the head of the user U has been described. However, the information processing device 10B may be a stationary device. In addition, the stationary device may include the attention information detection unit 120.

Figure 28:
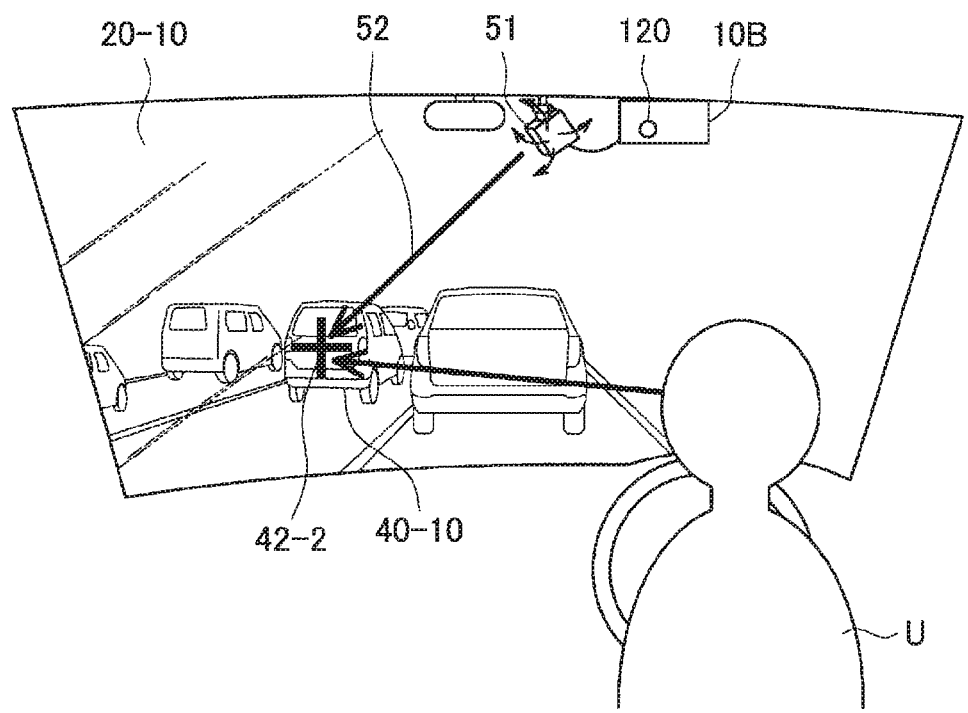
FIG. 28 is a diagram illustrating a seventh example of the information processing device 10B according to the embodiment.

FIG. 28 is a diagram illustrating a seventh example of the information processing device 10B according to the second embodiment of the present disclosure. As illustrated in FIG. 28, the information processing device 10B is a dashcam (recording device) installed in a vehicle having the user U as an occupant, and includes the attention information detection unit 120. Note that the information processing device 10B does not particularly need to include the output unit 160.

Referring to FIG. 28, a real object 40-10 and a viewpoint camera 51 that is a real camera are present in a real space 20-10. In the example illustrated in FIG. 28, the viewpoint camera 51 is mounted on the vehicle having the user U as an occupant. In the present example, a field of view of the viewpoint camera 51 is formed by a landscape that the viewpoint camera 51 images from the vehicle having the user U as an occupant. Referring to FIG. 28, a vehicle ahead is illustrated as an example of a real object 40-10 seen in the field of view. Note that the real object 40-10 is not limited to the vehicle ahead.

In the present example, the attention information detection unit 120 detects a line of sight 52 of the user U in the real space 20-10 as an example of attention information of the user U on the basis of a line of sight of the user U and a direction of the attention information detection unit 120. In addition, the acquisition unit 112 acquires the line of sight 52 of the user U in the real space 20-10, and acquires the position of the real object 40-10 in the real space 20-10 from the viewpoint camera 51 (e.g., a depth camera).

In the present example, parallel movement of a vehicle having the user U as an occupant, rotation of the viewpoint camera 51, and driving of a zoom lens included in the viewpoint camera 51 are controlled by the control unit 110; thus, non-zoom control and zoom control are performed.

3. Hardware Configuration Example

Figure 29:
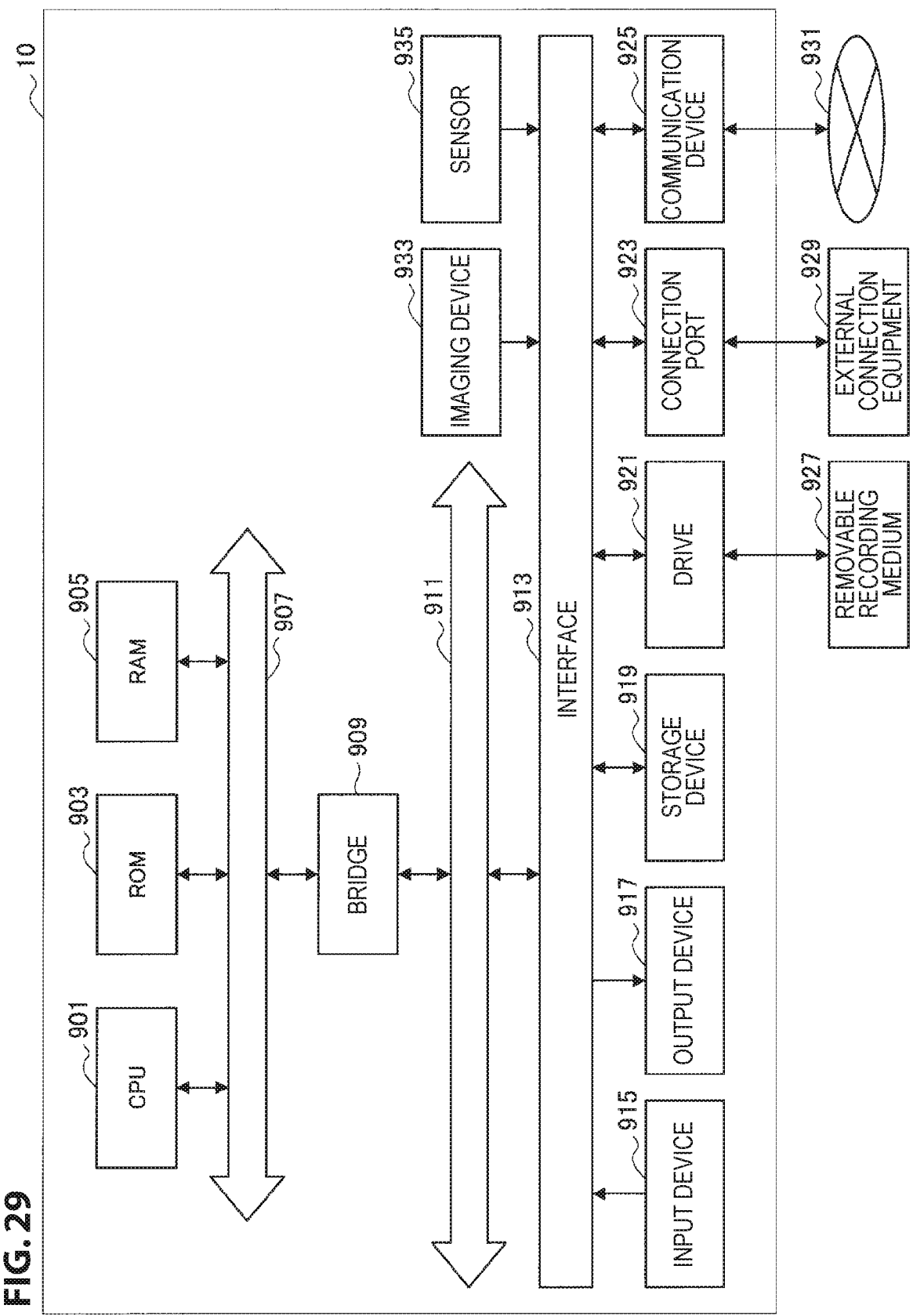
FIG. 29 is an explanatory diagram illustrating a hardware configuration example.

Next, with reference to FIG. 29, a hardware configuration of the information processing device 10 according to the embodiment of the present disclosure will be described. FIG. 29 is a block diagram illustrating the hardware configuration example of the information processing device 10 according to the embodiment of the present disclosure.

As illustrated in FIG. 29, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, a sound output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. In addition, the drive 921 writes the record into the mounted removable recording medium 927.

The connection port 923 is a port used to directly connect equipment to the information processing device 10. The connection port 923 may be, for example, a USB (Universal Serial Bus) port, an IEEE1394 port, a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. In addition, the communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. In addition, the sensor 935 may include a global positioning system (GPS) sensor that receives GPS signals to measure latitude, longitude, and altitude of the device.

Note that a computer program for realizing each of the functions of the information processing device 10 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium. In addition, the above-described computer program may be distributed through, for example, a network without using a recording medium.

4. Conclusion

As described above, according to an embodiment of the present disclosure, a decrease in visibility of an attention target can be suppressed in the case where zoom control and non-zoom control of a camera are performed.

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above embodiment describes an example in which non-zoom control is control for moving an attention target to a desired position of a field of view of a camera, but the present technology is not limited to such an example. For example, it is sufficient if non-zoom control is parallel movement control or rotation control of the camera excluding zoom control.

In addition, described above is controlling zoom speed of the camera in a manner that the attention target is located in the field of view of the camera at all times in the case where zoom control and non-zoom control are performed substantially simultaneously, but the present technology is not limited to such an example. For example, a control unit may control zoom speed to suppress separation of a position in the field of view corresponding to the attention target from the center of the field of view of the camera while non-zoom control is being performed. For example, an angle narrower than an angle of view of the camera may be set, and zoom speed may be controlled in a manner that a condition of zoom speed under which the attention target is located within the angle at all times is satisfied, as in the example described with reference to FIGS. 2 to 4. With such a configuration, the attention target is located near the center of the field of view of the camera; thus, visibility of the attention target is even less likely to decrease.

In addition, steps in the above-described embodiment need not be always processed in chronological order in accordance with the order described as a flowchart diagram. For example, steps in the processes in the above-described embodiment may be processed in an order different from the order described as a flowchart diagram, or may be concurrently processed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire attention information regarding an attention target of a user; and a zoom control unit configured to perform zoom control of a camera on the basis of non-zoom control of the camera and the attention information when the non-zoom control is performed on the basis of the attention information.

(2)

The information processing device according to (1), in which the zoom control unit performs the zoom control by controlling zoom speed of the camera on the basis of the non-zoom control.

(3)

The information processing device according to (2), in which the zoom control unit controls the zoom speed in a manner that the attention target is located in a field of view of the camera.

(4)

The information processing device according to (3), in which the zoom control unit controls the zoom speed in a manner that the attention target is located in the field of view at all times while the zoom control is being performed.

(5)

The information processing device according to (4), in which the zoom control unit controls the zoom speed in a manner that an angle-of-view change speed $\omega_Z$ or a parallel movement speed $v_Z$ of the camera in an optical axis direction, which is related to the zoom speed, satisfies a predetermined condition.

(6)

The information processing device according to (5), in which the predetermined condition is expressed as an expression (A) using an angle of view $\theta_S$ of the camera at a start time of the zoom control, a period t during which the zoom control is performed, a distance h between the attention target and an optical axis of the camera, a distance d between the camera and the attention target in the optical axis direction, a rotation speed $\omega_C$ of the camera, and a parallel movement speed $v_h$ of the camera in a direction perpendicular to the optical axis.

[Math. 14]

$$\omega_z \leq \frac{\theta_s - \mathrm{atan}\left(\frac{h - v_h t}{d - v_z t}\right)}{t} + \omega_c \quad (A)$$

(7)

The information processing device according to (5), in which the predetermined condition is expressed as an expression (B) using a period t during which the zoom control is performed, a distance h between the attention target and an optical axis of the camera, a distance d between the camera and the attention target in the optical axis direction, a rotation speed $\omega_C$ of the camera, and a parallel movement speed $v_h$ of the camera in a direction perpendicular to the optical axis.

[Math. 15]

$$\omega_c \leq \frac{1}{t} \mathrm{atan}\left(\frac{h - v_h t}{d - v_z t}\right) \quad (B)$$

(8)

The information processing device according to any one of (2) to (7), in which the zoom control unit controls the zoom speed to suppress separation of a position in a field of view of the camera from a center of the field of view of the camera while the non-zoom control is being performed, the position corresponding to the attention target.

(9)

The information processing device according to any one of (1) to (8), in which the zoom control includes changing a focal length related to the camera.

(10)

The information processing device according to any one of (1) to (9), in which the zoom control includes changing a relative distance between the camera and the attention target.

(11)

The information processing device according to any one of (1) to (10), in which the camera is a virtual camera that is present in a virtual space, and the non-zoom control includes controlling relative positions of the camera and a virtual object placed in the virtual space.

(12)

The information processing device according to any one of (1) to (11), in which the non-zoom control includes at least one of controlling parallel movement of the camera in a direction perpendicular to an optical axis of the camera or controlling rotation of the camera.

(13)

The information processing device according to any one of (1) to (12), in which the zoom control is performed substantially simultaneously with the non-zoom control.

(14)

The information processing device according to any one of (1) to (13), further including a first output control unit configured to cause an output unit to output a guide related to a zoom operation on the camera on the basis of the non-zoom control and the attention information.

(15)

The information processing device according to (14), in which the first output control unit causes the output unit to output the guide in a case where zoom speed of the camera is limited in the zoom control.

(16)

The information processing device according to any one of (1) to (15), in which the non-zoom control is control to move the attention target to a predetermined position in a field of view of the camera.

(17)

The information processing device according to any one of (1) to (16), in which the camera is a virtual camera that is present in a virtual space, and the information processing device further includes a second output control unit configured to control display of an image obtained by the camera.

(18)

The information processing device according to any one of (1) to (16), in which the camera is present in a real space, and the zoom control unit controls lens driving of the camera.

(19)

An information processing method including:

acquiring attention information regarding an attention target of a user; and performing, by a processor, zoom control of a camera on the basis of non-zoom control of the camera and the attention information when the non-zoom control is performed on the basis of the attention information.

(20)

A program causing a computer to implement:

a function of acquiring attention information regarding an attention target of a user; and a function of performing zoom control of a camera on the basis of non-zoom control of the camera and the attention information when the non-zoom control is performed on the basis of the attention information.

REFERENCE SIGNS LIST

10 information processing device
20 space (real space, virtual space)
40 object (real object, virtual object)
42-2 movement reference point
51 viewpoint camera
52 line of sight
53
55 track
60 object (real object, virtual object)
61 region of interest
62 movement reference point
63 guide frame
71 real camera
72 stereo camera
73 robot arm
74 operating table
110 control unit
111 output control unit
112 acquisition unit
113 determination unit
114 rotation control unit
115 movement control unit
116 zoom control unit
120 attention information detection unit
130 operation detection unit 140 sensor unit
150 (150A, 150B) storage unit
151 3D model information
160 output unit

The invention claimed is:

1. An information processing device, comprising:
at least one processor configured to:
acquire, from a sensor, attention information that indicates at least one of a gaze direction or a pointing direction of a user toward an attention target of the user;
control a display device to display a field of view of a camera that includes the attention target; and
perform zoom control of the field of view based on non-zoom control of the field of view and the attention information when the non-zoom control is based on the attention information, wherein
the zoom control is further performed based on control of zoom speed of the field of view to suppress separation of the attention target from a center of the field of view while the non-zoom control is performed.

2. The information processing device according to claim 1, wherein the at least one processor is further configured to control the zoom speed in a manner that the attention target is in the field of view while the zoom control is performed.

3. The information processing device according to claim 1, wherein the at least one processor is further configured to control the zoom speed in a manner that at least one of an angle change speed $\omega_z$ of the field of view or a parallel movement speed $v_z$ of the field of view in an optical axis direction of the camera satisfies a condition.

4. The information processing device according to claim 3, wherein the condition is expressed as an expression (A) using an angle of view $\theta_s$ of the camera at a start time of the zoom control, a period t during which the zoom control is performed, a distance h between the attention target and an optical axis of the camera, a distance d between the camera and the attention target in the optical axis direction, a rotation speed $\omega_c$ of the camera, and a parallel movement speed $v_h$ of the camera in a direction perpendicular to the optical axis.

[Math. 16]

$$\omega_z \leq \frac{\theta_s - \mathrm{atan}\left(\frac{h - v_h t}{d - v_z t}\right)}{t} + \omega_c. \tag{A}$$

5. The information processing device according to claim 3, wherein the condition is expressed as an expression (B) using a period t during which the zoom control is performed, a distance h between the attention target and an optical axis of the camera, a distance d between the camera and the attention target in the optical axis direction, a rotation speed $\omega_c$ of the camera, and a parallel movement speed $v_h$ of the camera in a direction perpendicular to the optical axis.

[Math. 17]

$$\omega_c \leq \frac{1}{t}\mathrm{atan}\left(\frac{h - v_h t}{d - v_z t}\right). \tag{B}$$

6. The information processing device according to claim 1, wherein the zoom control includes change of a focal length associated with the camera.

7. The information processing device according to claim 1, wherein the zoom control includes change of a relative distance between the camera and the attention target.

8. The information processing device according to claim 1, wherein the zoom control is performed substantially simultaneously with the non-zoom control.

9. The information processing device according to claim 1, wherein the at least one processor is further configured to control the display device to display a guide that indicates that the zoom speed of the field of view is limited in the zoom control.

10. The information processing device according to claim 1, wherein the non-zoom control is control to move the attention target to a position in the field of view.

11. The information processing device according to claim 1, wherein
the camera is a real camera in a real space, and
the at least one processor is further configured to control drive of the real camera while the zoom control and the non-zoom control are performed.

12. An image processing device, comprising:
at least one processor configured to:
acquire, from a sensor, attention information that indicates at least one of a gaze direction or a pointing direction of a user toward an attention target of the user;
control a display device to display a field of view of a camera that includes the attention target; and
perform zoom control of the field of view based on non-zoom control of the field of view and the attention information when the non-zoom control is based on the attention information, wherein
the camera is a virtual camera that is in a virtual space,
the attention target is a virtual object, and
the non-zoom control includes controlling relative positions of the virtual camera and the virtual object placed in the virtual space.

13. An image processing device, comprising:
at least one processor configured to:
acquire, from a sensor, attention information that indicates at least one of a gaze direction or a pointing direction of a user toward an attention target of the user;
control a display device to display a field of view of a camera that includes the attention target; and
perform zoom control of the field of view based on non-zoom control of the field of view and the attention information when the non-zoom control is based on the attention information,
wherein the non-zoom control includes at least one of control of parallel movement of the camera in a direction perpendicular to an optical axis of the camera or control of rotation of the camera.

14. An information processing method, comprising:
acquiring, from a sensor, attention information that indicates at least one of a gaze direction or a pointing direction of a user toward an attention target of the user;
controlling a display device to display a field of view of a camera that includes the attention target; and
performing, by a processor, zoom control of the field of view based on non-zoom control of the field of view and the attention information when the non-zoom control is based on the attention information, wherein the zoom control is further performed based on control of zoom speed of the field of view to suppress separation of the attention target from a center of the field of view while the non-zoom control is performed.

15. A non-transitory computer-readable medium having stored thereon computer-readable instructions, which when executed by an image processing device, cause the image processing device to execute operations, the operations comprising:

acquiring, from a sensor, attention information that indicates at least one of a gaze direction or a pointing direction of a user toward an attention target of the user;

controlling a display device to display a field of view of a camera that includes the attention target; and performing zoom control of the field of view based on non-zoom control of the field of view and the attention information when the non-zoom control is based on the attention information, wherein the zoom control is further performed based on control of zoom speed of the field of view to suppress separation of the attention target from a center of the field of view while the non-zoom control is performed.

* * * * *